US012739390B2

(12) United States Patent
Salehifar et al.

(10) Patent No.: US 12,739,390 B2
(45) **Date of Patent: *Sep. 15, 2026**

(54) METHOD FOR CODING IMAGE ON BASIS OF SELECTIVE TRANSFORM AND DEVICE THEREFOR

(71) Applicant: LG ELECTRONICS INC., Seoul (KR)

(72) Inventors: Mehdi Salehifar, Seoul (KR); Seunghwan Kim, Seoul (KR); Moonmo Koo, Seoul (KR); Jaehyun Lim, Seoul (KR); Seethal Paluri, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 19/098,927

(22) Filed: Apr. 2, 2025

(65) Prior Publication Data

US 2025/0294153 A1 Sep. 18, 2025

Related U.S. Application Data

(63) Continuation of application No. 18/676,359, filed on May 28, 2024, now Pat. No. 12,284,356, which is a (Continued)

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/176* (2014.11); *H04N 19/18* (2014.11)

(58) Field of Classification Search
CPC .... H04N 19/105; H04N 19/12; H04N 19/132; H04N 19/176; H04N 19/18; H04N 19/60; H04N 19/61
See application file for complete search history.

(56) References Cited

U.S. PATENT DOCUMENTS

| | | | | |
|---|---|---|---|---|
| 11,647,199 | B2 * | 5/2023 | Salehifar | H04N 19/61 375/240.02 |
| 2012/0008675 | A1 * | 1/2012 | Karczewicz | H04N 19/176 375/240.18 |

(Continued)

FOREIGN PATENT DOCUMENTS

| | | |
|---|---|---|
| CN | 103002279 A | 3/2013 |
| CN | 103152562 A | 6/2013 |

(Continued)

OTHER PUBLICATIONS

"Fast Implementation for Symmetric Non-Separable Transforms Based on Grids"—Keng-Shih Lu and Antonio Ortega; Department of EE, USC, Los Angeles, USA; 978-1-5090-4117-6/17/$31.00 Â © 2017 IEEE. (Year: 2017).*

(Continued)

*Primary Examiner* — Mainul Hasan
(74) *Attorney, Agent, or Firm* — BRYAN CAVE LEIGHTON PAISNER LLP

(57) ABSTRACT

A method for decoding an image by a decoding device according to the present invention comprises the steps of: deriving, from a bit stream, transform coefficients of a block to be decoded; deriving residual samples of the block to be decoded, on the basis of a selective transform of the transform coefficients; and generating a reconstructed picture on the basis of the residual samples of the block to be decoded and prediction samples of the block to be decoded, wherein the selective transform is performed on the basis of a modified transform matrix, the modified transform matrix (Continued)

comprises a matrix including a modified basis vector, and the modified basis vector contains a certain number of elements selected from N elements.

3 Claims, 18 Drawing Sheets

Related U.S. Application Data continuation of application No. 18/122,552, filed on Mar. 16, 2023, now Pat. No. 12,034,933, which is a continuation of application No. 17/385,628, filed on Jul. 26, 2021, now Pat. No. 11,647,199, which is a continuation of application No. 16/904,985, filed on Jun. 18, 2020, now Pat. No. 11,184,618, which is a continuation of application No. PCT/KR2018/016437, filed on Dec. 21, 2018.

(60) Provisional application No. 62/609,270, filed on Dec. 21, 2017.

(51) Int. Cl.
*H04N 19/176* (2014.01)
*H04N 19/18* (2014.01)

(56) References Cited

U.S. PATENT DOCUMENTS

2012/0057630 A1* 3/2012 Saxena ................ H04N 19/105 375/240.03
2012/0170858 A1 7/2012 Andersson et al.
2012/0230417 A1* 9/2012 Sole Rojals ......... H04N 19/129 375/240.18
2013/0195177 A1 8/2013 Hong et al.
2014/0241424 A1 8/2014 Oh et al.
2014/0328403 A1 11/2014 Lim et al.
2015/0264403 A1* 9/2015 Chong ................ H04N 19/176 375/240.18
2016/0014414 A1 1/2016 Lin et al.
2016/0191942 A1 6/2016 Oh
2016/0219290 A1* 7/2016 Zhao .................... H04N 19/167
2017/0094313 A1 3/2017 Zhao et al.
2017/0094314 A1* 3/2017 Zhao .................... H04N 19/176
2017/0150183 A1* 5/2017 Zhang .................. H04N 19/597
2018/0020218 A1* 1/2018 Zhao .................... H04N 19/124
2018/0103252 A1 4/2018 Hsieh et al.
2018/0199072 A1* 7/2018 Li ........................ H04N 19/186
2019/0215516 A1* 7/2019 Lim ..................... H04N 19/176
2020/0162738 A1* 5/2020 Kanoh ................... H04N 19/12
2020/0213626 A1* 7/2020 Ikai ...................... H04N 19/176
2020/0322633 A1* 10/2020 Tsukuba ................. H04N 19/61

FOREIGN PATENT DOCUMENTS

CN 104378637 A 2/2015
CN 105516730 A 4/2016
CN 105791867 A 7/2016
CN 107251499 A 10/2017
JP 2005012473 A 1/2005
KR 1020150070848 A 6/2015

OTHER PUBLICATIONS

"Improved Video Compression Efficiency Through Flexible Unit Representation and Corresponding Extension of Coding Tools"—Han et al., IEEE Transactions on Circuits and Systems for Video Technology, vol. 20, No. 12, Dec. 2010 (Year: 2010).*
Zhoa, "NSST: Non-Separable Secondary Transforms for Next Generation Video Coding," Jan. 7, 2021, 4 pages.

* cited by examiner

Figure 1:
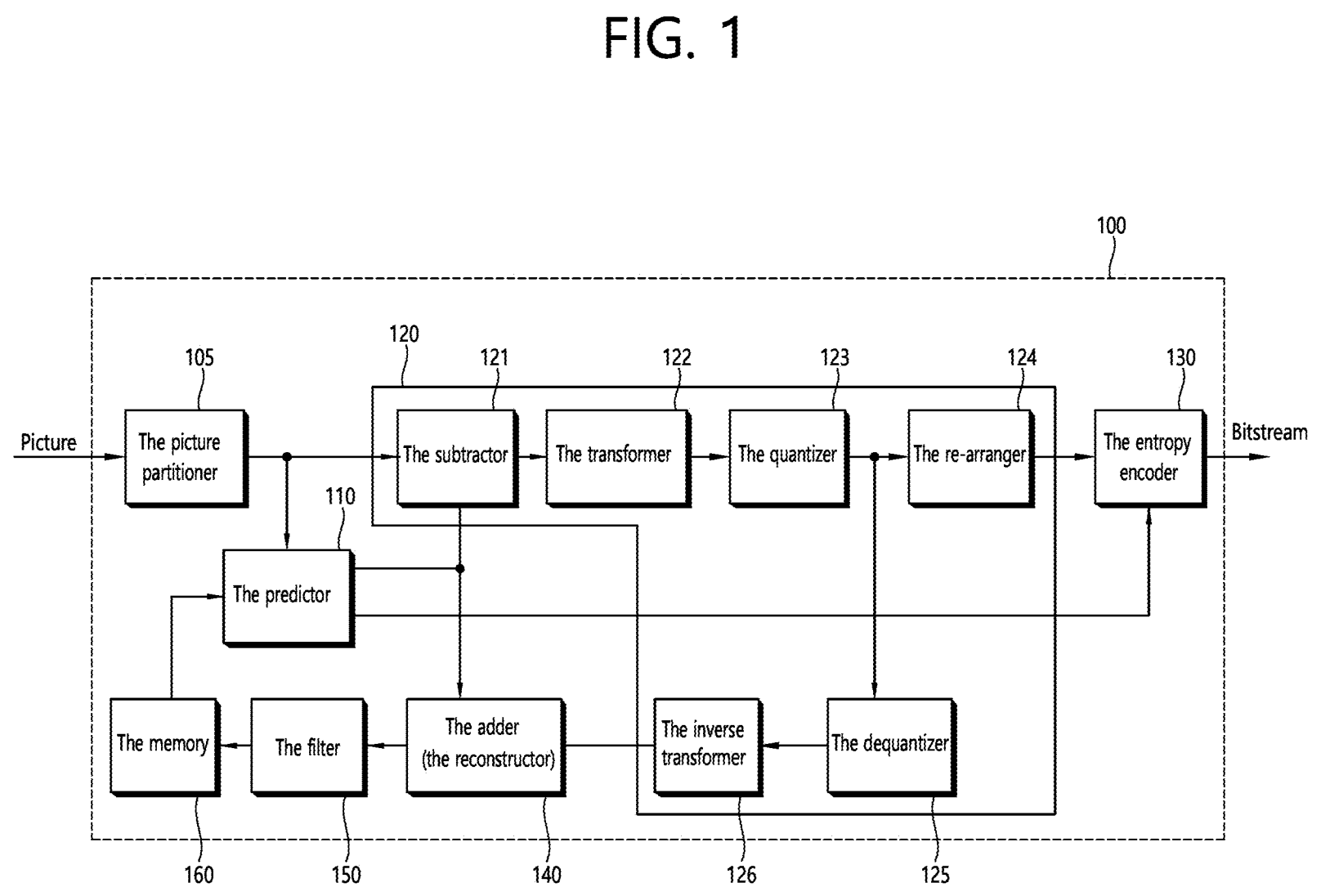

Picture

105 The picture partitioner

110 The predictor

120

121 The subtractor

122 The transformer

123 The quantizer

124 The re-arranger

125 The dequantizer

126 The inverse transformer

130 The entropy encoder

140 The adder (the reconstructor)

150 The filter

160 The memory

Bitstream

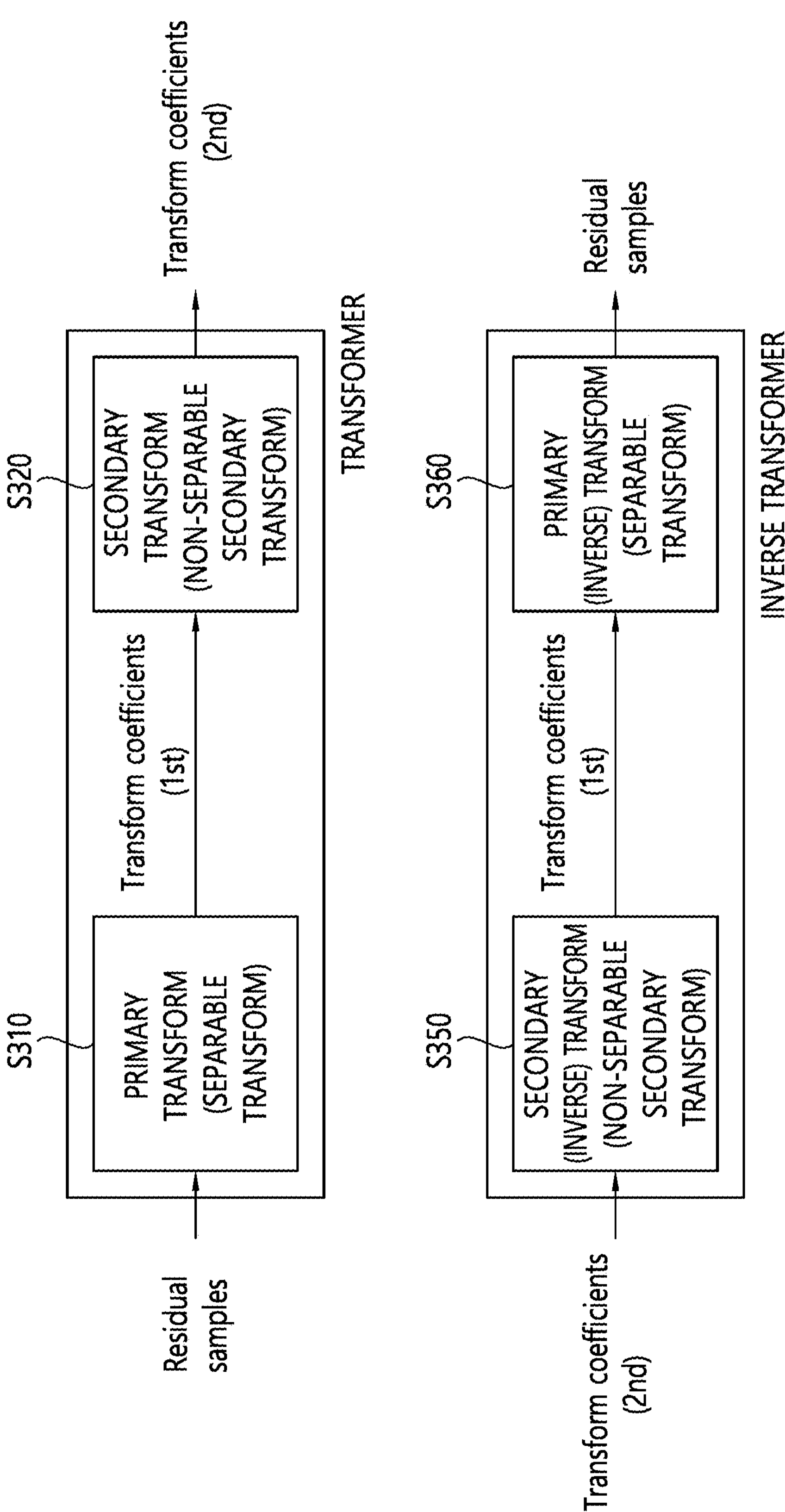
FIG. 3
Residual samples
S310
PRIMARY TRANSFORM (SEPARABLE TRANSFORM)
Transform coefficients (1st)
S320
SECONDARY TRANSFORM (NON-SEPARABLE SECONDARY TRANSFORM)
Transform coefficients (2nd)
TRANSFORMER
Transform coefficients (2nd)
S350
SECONDARY (INVERSE) TRANSFORM (NON-SEPARABLE SECONDARY TRANSFORM)
Transform coefficients (1st)
S360
PRIMARY (INVERSE) TRANSFORM (SEPARABLE TRANSFORM)
Residual samples
INVERSE TRANSFORMER

FIG. 15

| Transform Type | Basis function $T_i(j)$, $i, j = 0, 1, \ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ where $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$, where $\omega_0 = \begin{cases} \sqrt{\frac{2}{N}} & i = 0 \\ 1 & i \neq 0 \end{cases}$, $\omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

FIG. 16

| Transform Set | Transform Candidates |
|---|---|
| 0 | DST-VII, DCT-VIII |
| 1 | DST-VII, DST-I |
| 2 | DST-VII, DCT-VIII |

FIG. 17

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 | |
|---|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 | |
| H | 2 | 2 | 2 | 2 | 2 | 1 | 0 | 1 | 0 | 1 | 0 | 1 | 0 | 1 | 0 | 1 | 0 | |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 | | | | |
|---|---|---|---|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 | | | | |
| H | 0 | 0 | 1 | 0 | 1 | 0 | 1 | 0 | 1 | 0 | 1 | 0 | 1 | 0 | | | | |

| intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| *set* | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |

| intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 (LM) |
|---|---|---|---|---|---|---|---|---|---|---|---|---|---|---|---|---|---|---|---|---|---|---|---|---|---|---|---|---|---|---|---|---|---|---|
| *set* | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | NULL |

| | Separable Transform (NxN) | Non Separable Transform (NxN) |
|---|---|---|
| Memory | $N^2$ | $N^4$ |
| Multiplication | $2N^3$ | $N^4$ |

METHOD FOR CODING IMAGE ON BASIS OF SELECTIVE TRANSFORM AND DEVICE THEREFOR

CROSS REFERENCE TO RELATED APPLICATIONS

This is a Continuation of U.S. patent application Ser. No. 18/676,359 filed May 28, 2024, which is a continuation of U.S. patent application Ser. No. 18/122,552, filed Mar. 16, 2023, now U.S. patent Ser. No. 12/034,933 issued Jul. 9, 2024, which is a this is a Continuation of U.S. patent application Ser. No. 17/385,628, filed Jul. 26, 2021, now U.S. patent Ser. No. 11/647,199 issued May 9, 2023, which is a Continuation Application of U.S. patent application Ser. No. 16/904,985, filed Jun. 18, 2020, now U.S. patent Ser. No. 11/184,618 issued Nov. 23, 2021, which is a Bypass of PCT Application No. PCT/KR2018/016437, with an international filing date of Dec. 21, 2018, which claims the benefit of U.S. Provisional Application No. 62/609,270, filed on Dec. 21, 2017, all of which are incorporated by reference in their entirety herein.

BACKGROUND OF THE DISCLOSURE

Field of the Disclosure

The present disclosure relates to an image coding technology, and more particularly, to an image decoding method according to a selective transform in an image coding system and a device therefor.

Related Art

Demand for high-resolution, high-quality images such High Definition (HD) images and Ultra High Definition (UHD) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

A technical problem to be addressed by the present disclosure lies in providing a method and a device which increase image coding efficiency.

Another technical problem to be addressed by the disclosure lies in providing a method and a device which increase transform efficiency.

Still another technical problem to be addressed by the present disclosure lies in providing a method and a device which increase efficiency of residual coding through transform.

Still another technical problem to be addressed by the present disclosure lies in providing an image coding method and a device based on selective transform.

According to an example of the present disclosure, there is provided an image decoding method which is performed by a decoding device. The method includes deriving transform coefficients of a target block from a bitstream, deriving residual samples for the target block based on a selective transform for the transform coefficients, and generating a reconstructed picture based on the residual samples for the target block and prediction samples for the target block, wherein the selective transform is performed based on a modified transform matrix, the modified transform matrix is a matrix including a modified basis vector, and the modified basis vector includes a specific number of elements selected from among N number of elements.

According to another example of the present disclosure, there is provided a decoding device performing image decoding. The decoding device includes an entropy decoder deriving transform coefficients of a target block from a bitstream, an inverse transformer deriving residual samples for the target block based on a selective transform for the transform coefficients, and an adder generating a reconstructed picture based on the residual samples for the target block and prediction samples for the target block, wherein the selective transform is performed based on a modified transform matrix, the modified transform matrix is a matrix including a modified basis vector, and the modified basis vector includes a specific number of elements selected from among N number of elements.

According to still another example of the present disclosure, there is provided a video encoding method which is performed by an encoding device. The method includes deriving residual samples of a target block, deriving transform coefficients of the target block based on a selective transform for the residual samples, and encoding information on the transform coefficients, wherein the selective transform is performed based on a modified transform matrix, the modified transform matrix is a matrix including a modified basis vector, and the modified basis vector includes a specific number of elements selected from among N number of elements.

According to still another example of the present disclosure, there is provided a video encoding device. The encoding device includes an adder deriving residual samples of a target block, a transformer deriving transform coefficients of the target block based on a selective transform for the residual samples, and an entropy encoder encoding information on the transform coefficients, wherein the selective transform is performed based on a modified transform matrix, the modified transform matrix is a matrix including a modified basis vector, and the modified basis vector includes a specific number of elements selected from among N number of elements.

According to the present disclosure, through efficient transform it is possible to reduce amount of data that must be transferred for a residual process, and increase the residual coding efficiency.

According to the present disclosure, it is possible to perform non-separable transform based on a transform matrix consisting of a basis vector including a specific number of selected elements, through which it is possible to decrease a memory load and computational complexity for non-separable transform, and increase the residual coding efficiency.

According to the present disclosure, the non-separable transform can be performed based on a transform matrix of a simplified structure, through which it is possible to reduce amount of data that must be transferred for a residual process, to increase the residual coding efficiency.

BRIEF DESCRIPTION OF THE DRAWINGS

FIG. 1 is a schematic diagram illustrating a configuration of a video encoding apparatus to which the present disclosure is applicable.

FIG. 3 schematically represents a multiple transform technique according to the present disclosure.

FIG. 15 exemplarily represents the basis functions for defining the DCT/DST transform types.

FIG. 16 exemplarily represents the predetermined transform subsets.

FIG. 17 exemplarily represents the transform subset for the vertical transform kernel and the transform subset for the horizontal transform kernel.

DESCRIPTION OF EXEMPLARY EMBODIMENTS

Figure 2:
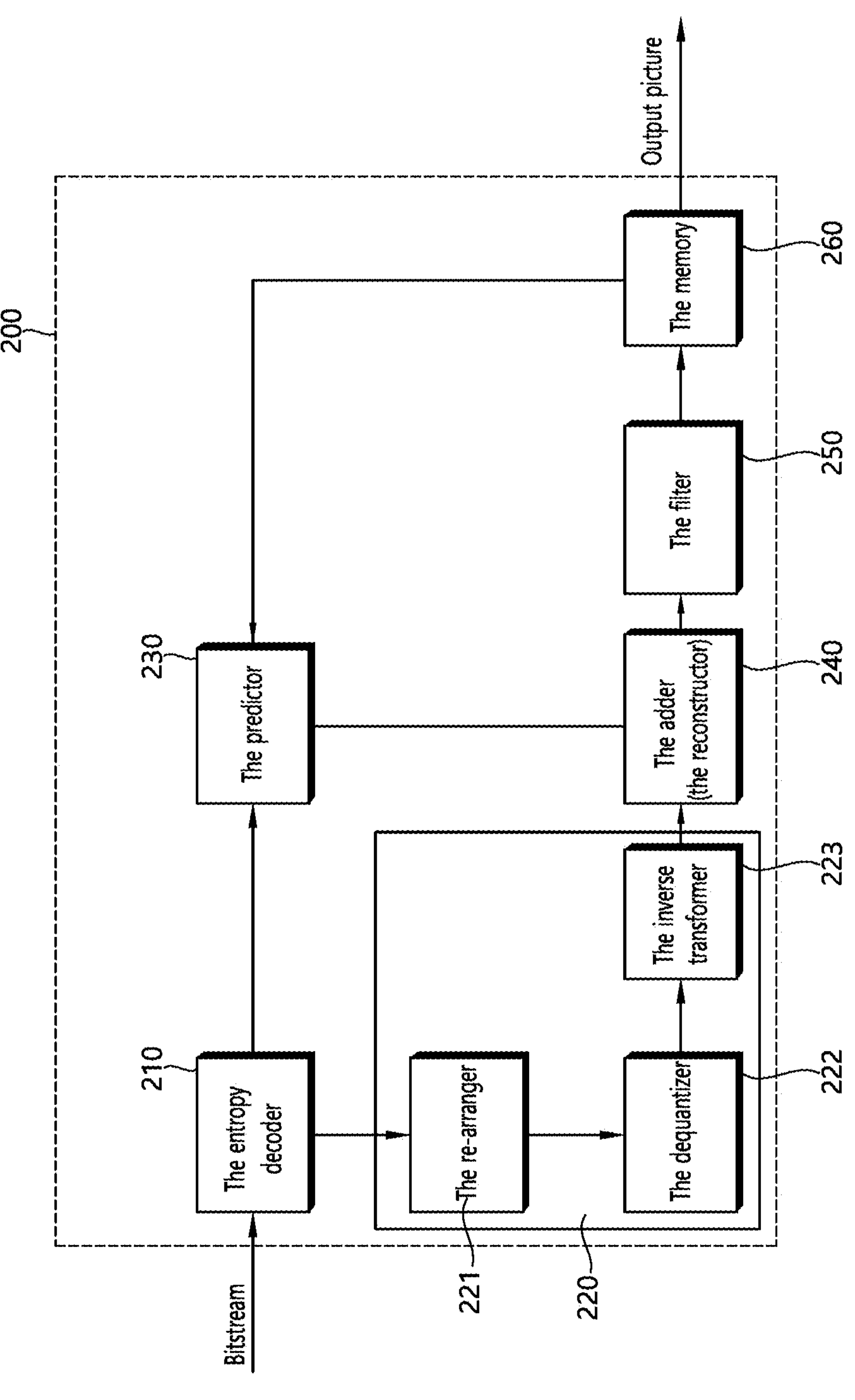
FIG. 2 is a schematic diagram illustrating a configuration of a video decoding apparatus to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

Meanwhile, the present disclosure relates to video/image coding. For example, the method(s)/embodiment(s) disclosed in the present disclosure may be applied to a method disclosed in a versatile video coding (VVC) standard or a next generation video/image coding standard.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 is a schematic diagram illustrating a configuration of a video encoding device to which the present disclosure is applicable.

Referring to FIG. 1, a video encoding device (100) may include a picture partitioner (105), a predictor (110), a residual processor (120), an entropy encoder (130), an adder (140), a filter (150), and a memory (160). The residual processor (120) may include a subtractor (121), a transformer (122), a quantizer (123), a re-arranger (124), a dequantizer (125), an inverse transformer (126).

The picture partitioner (105) may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present disclosure may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor (110) may perform prediction on a processing target block (hereinafter, a current block), and may generate a predicted block including prediction samples for the current block. A unit of prediction performed in the predictor (110) may be a coding block, or may be a transform block, or may be a prediction block.

The predictor (110) may determine whether intra-prediction is applied or inter-prediction is applied to the current block. For example, the predictor (110) may determine whether the intra-prediction or the inter-prediction is applied in unit of CU.

In case of the intra-prediction, the predictor (110) may derive a prediction sample for the current block based on a reference sample outside the current block in a picture to which the current block belongs (hereinafter, a current picture). In this case, the predictor (110) may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor (110) may determine the prediction mode to be applied to the current block by using the prediction mode applied to the neighboring block.

In case of the inter-prediction, the predictor (110) may derive the prediction sample for the current block based on a sample specified by a motion vector on a reference picture. The predictor (110) may derive the prediction sample for the current block by applying any one of a skip mode, a merge mode, and a motion vector prediction (MVP) mode. In case of the skip mode and the merge mode, the predictor (110) may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor (121) generates a residual sample which is a difference between an original sample and a prediction sample. If the skip mode is applied, the residual sample may not be generated as described above.

The transformer (122) transforms residual samples in units of a transform block to generate a transform coefficient. The transformer (122) may perform transformation based on the size of a corresponding transform block and a prediction mode applied to a coding block or prediction block spatially overlapping with the transform block. For example, residual samples can be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer (123) may quantize the transform coefficients to generate quantized transform coefficients.

The re-arranger (124) rearranges quantized transform coefficients. The re-arranger (124) may rearrange the quantized transform coefficients in the form of a block into a one-dimensional vector through a coefficient scanning method. Although the re-arranger (124) is described as a separate component, the re-arranger (124) may be a part of the quantizer (123).

The entropy encoder (130) may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder (130) may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer (125) dequantizes values (transform coefficients) quantized by the quantizer (123) and the inverse transformer (126) inversely transforms values dequantized by the dequantizer (125) to generate a residual sample.

The adder (140) adds a residual sample to a prediction sample to reconstruct a picture. The residual sample may be added to the prediction sample in units of a block to generate a reconstructed block. Although the adder (140) is described as a separate component, the adder (140) may be a part of the predictor (110). Meanwhile, the adder (140) may be referred to as a reconstructor or reconstructed block generator.

The filter (150) may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter (150) may apply an adaptive loop filter (ALF) to the reconstructed picture. The ALF may be applied to the reconstructed picture to which deblocking filtering and/or sample adaptive offset has been applied.

The memory (160) may store a reconstructed picture (decoded picture) or information necessary for encoding/decoding. Here, the reconstructed picture may be the reconstructed picture filtered by the filter (150). The stored reconstructed picture may be used as a reference picture for (inter) prediction of other pictures. For example, the memory (160) may store (reference) pictures used for inter-prediction. Here, pictures used for inter-prediction may be designated according to a reference picture set or a reference picture list.

FIG. 2 is a schematic diagram illustrating a configuration of a video decoding device to which the present disclosure is applicable.

Referring to FIG. 2, a video decoding device (200) may include an entropy decoder (210), a residual processor (220), a predictor (230), an adder (240), a filter (250), and a memory (260). The residual processor (220) may include a re-arranger (221), a dequantizer (222), an inverse transformer (223).

When a bitstream including video information is input, the video decoding device (200) may reconstruct a video in relation to a process by which video information is processed in the video encoding device.

For example, the video decoding device (200) may perform video decoding using a processing unit applied in the video encoding device. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder (210) may parse the bitstream to output information required for video reconstruction or picture reconstruction. For example, the entropy decoder (210) may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information on prediction among information decoded in the entropy decoder (210) may be provided to the predictor (230) and residual values, that is, quantized transform coefficients, on which entropy decoding has been performed by the entropy decoder (210) may be input to the re-arranger (221).

The re-arranger (221) may rearrange the quantized transform coefficients into a two-dimensional block form. The re-arranger (221) may perform rearrangement corresponding to coefficient scanning performed by the encoding device. Although the re-arranger (221) is described as a separate component, the re-arranger (221) may be a part of the dequantizer (222).

The dequantizer (222) may de-quantize the quantized transform coefficients based on a (de)quantization parameter to output a transform coefficient. In this case, information for deriving a quantization parameter may be signaled from the encoding device.

The inverse transformer (223) may inverse-transform the transform coefficients to derive residual samples.

The predictor (230) may perform prediction on a current block, and may generate a predicted block including prediction samples for the current block. A unit of prediction performed in the predictor (230) may be a coding block or may be a transform block or may be a prediction block.

The predictor (230) may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor (230) may derive a prediction sample for a current block based on a neighboring reference sample in a current picture. The predictor (230) may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor (230) may derive a prediction sample for a current block based on a sample specified in a reference picture according to a motion vector. The predictor (230) may derive the prediction sample for the current block using one of the skip mode, the merge mode and the MVP mode. Here, motion information required for inter-prediction of the current block provided by the video encoding device, for example, a motion vector and information on a reference picture index may be obtained or derived based on the information on prediction.

In the skip mode and the merge mode, motion information of a neighboring block may be used as motion information of the current block. Here, the neighboring block may include a spatial neighboring block and a temporal neighboring block.

The predictor (230) may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information on prediction may include a merge index indicating a candidate block having the best motion vector selected from candidate blocks included in the merge candidate list. Here, the predictor (230) may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information on prediction may include a prediction motion vector index indicating the best motion vector selected from motion vector candidates included in the list. Here, the predictor (230) may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor (230) may obtain a motion vector included in the information on prediction and derive the motion vector of the current block by adding the motion vector difference to the motion vector predictor. In addition, the predictor may obtain or derive a reference picture index indicating a reference picture from the aforementioned information on prediction.

The adder (240) can add a residual sample to a prediction sample to reconstruct a current block or a current picture. The adder (240) may reconstruct the current picture by adding the residual sample to the prediction sample in units of a block. When the skip mode is applied, a residual is not transmitted and thus the prediction sample may become a reconstructed sample. Although the adder (240) is described as a separate component, the adder (240) may be a part of the predictor (230). Meanwhile, the adder (240) may be referred to as a reconstructor or reconstructed block generator.

The filter (250) may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory (260) may store a reconstructed picture (decoded picture) or information necessary for decoding. Here, the reconstructed picture may be the reconstructed picture filtered by the filter (250). For example, the memory (260) may store pictures used for inter-prediction. Here, the pictures used for inter-prediction may be designated according to a reference picture set or a reference picture list. A reconstructed picture may be used as a reference picture for other pictures. The memory (260) may output reconstructed pictures in an output order.

Meanwhile, transform coefficients of lower frequency for the residual block of the current block may be derived through the above-described transform, and a zero-tail may be derived at the end of the residual block.

Specifically, the transform may consist of two major processes, and the major processes may include a core transform and a secondary transform. A transform including the core transform and the secondary transform may be represented as a multiple transform technique.

FIG. 3 schematically represents a multiple transform technique according to the present disclosure.

Referring to FIG. 3, a transformer may correspond to the transformer in the encoding device of foregoing FIG. 1, and an inverse transformer may correspond to the inverse transformer in the encoding device of foregoing FIG. 1, or the inverse transformer in the decoding device of FIG. 2.

The transformer may derive (primary) transform coefficients by performing a primary transform based on residual samples (residual sample array) in a residual block (S310). In this connection, the primary transform may include an adaptive multiple core transform (AMT). The adaptive multiple core transform may be represented as a multiple transform set (MTS).

The adaptive multiple core transform may represent a method of transforming additionally using discrete cosine transform (DCT) type 2 and discrete sine transform (DST) type 7, DCT type 8, and/or DST type 1. That is, the adaptive multiple core transform may represent a transform method of transforming residual signal (or residual block) of a space domain into transform coefficients (or primary transform coefficients) of a frequency domain based on a plurality of transform kernels selected from among the DCT type 2, the DST type 7, the DCT type 8 and the DST type 1. In this connection, the primary transform coefficients may be called temporary transform coefficients from the viewpoint of the transformer.

In other words, if the existing transform method is applied, transform coefficients might be generated by applying transform from a space domain to a frequency domain for a residual signal (or residual block) based on the DCT type 2. Unlike to this, if the adaptive multiple core transform is applied, transform coefficients (or primary transform coefficients) may be generated by applying transform from a space domain to a frequency domain for a residual signal (or residual block) based on the DCT type 2, the DST type 7, the DCT type 8, and/or DST type 1. Here, the DCT type 2, the DST type 7, the DCT type 8, and the DST type 1 may be called a transform type, transform kernel or transform core.

For reference, the DCT/DST transform types may be defined based on basis functions, and the basis functions may be represented as in the FIG. 15.

FIG. 15 exemplarily represents the basis functions for defining the DCT/DST transform types.

If the adaptive multiple core transform is performed, a vertical transform kernel and a horizontal transform kernel for a target block may be selected from among the transform kernels, the vertical transform for the target block may be performed based on the vertical transform kernel, and the horizontal transform for the target block may be performed based on the horizontal transform kernel. Here, the horizontal transform may represent a transform for horizontal components of the target block, and the vertical transform may represent a transform for vertical components of the target block. The vertical transform kernel/horizontal transform kernel may be adaptively determined based on a transform index indicating a prediction mode and/or a transform subset of a target block (CU or sub-block) which encompasses a residual block.

For example, the adaptive multiple core transform may be applied when both the width and the height of the target block are less than or equal to 64, and determination may be made based on a CU level flag as to whether the adaptive multiple core transform of the target block is applied. Specifically, if the CU level flag is 0, the above-described existing transform method may be applied. That is, if the CU level flag is 0, transform coefficients may be generated by applying transform from a space domain to a frequency domain for a residual signal (or residual block) based on the DCT type 2, and the transform coefficients may be encoded. Meanwhile, here the target block may be a CU. If the CU level flag is 0, the adaptive multiple core transform may be applied to the target block.

Further, if the target block to which the adaptive multiple core transform is applied is a luma block, two additional flags may be signaled, and the vertical transform kernel and the horizontal transform kernel may be selected based on the flags. The flag for the vertical transform kernel may be represented as an AMT vertical flag, and AMT_TU_vertical_flag (or EMT_TU_vertical_flag) may represent a syntax element of the AMT vertical flag. The flag for the horizontal transform kernel may be represented as an AMT horizontal flag, and AMT_TU_horizontal_flag (or EMT_TU_horizontal_flag) may represent a syntax element of the AMT horizontal flag. The AMT vertical flag may indicate one transform kernel candidate of transform kernel candidates included in the transform subset for the vertical transform kernel, and the transform kernel candidate indicated by the AMT vertical flag may be derived as a vertical transform kernel for the target block. Further, the AMT horizontal flag may indicate one transform kernel candidate of transform kernel candidates included in the transform subset for the horizontal transform kernel, and the transform kernel candidate indicated by the AMT horizontal flag may be derived as a horizontal transform kernel for the target block. Meanwhile, the AMT vertical flag may be represented as an MTS vertical flag, and the AMT horizontal flag may be represented as an MTS horizontal flag.

Meanwhile, three transform subsets may be predetermined, and one of the transform subsets may be derived as a transform subset for the vertical transform kernel based on the intra prediction mode applied to the target block. Further, one of the transform subsets may be derived as a transform subset for the horizontal transform kernel based on the intra prediction mode applied to the target block. For example, the predetermined transform subsets may be derived as in FIG. 16.

FIG. 16 exemplarily represents the predetermined transform subsets.

Referring to FIG. 2, the transform subset whose index value is 0 may represent the transform subset including the DST type 7 and the DCT type 8 as a transform kernel candidate, the transform subset whose index value is 1 may represent the transform subset including the DST type 7 and the DST type 1 as a transform kernel candidate, and the transform subset whose index value is 2 may represent the transform subset including the DST type 7 and the DCT type 8 as a transform kernel candidate.

The transform subset for the vertical transform kernel and the transform subset for the horizontal transform kernel which are derived based on the intra prediction mode applied to the target block may be derived as shown in FIG. 17.

FIG. 17 exemplarily represents the transform subset for the vertical transform kernel and the transform subset for the horizontal transform kernel.

Here, V represents the transform subset for the vertical transform kernel, and H represents the transform subset for the horizontal transform kernel.

If the value of the AMT flag (or EMT_CU_flag) for the target block is 1, the transform subset for the vertical transform kernel and the transform subset for the horizontal transform kernel may be derived based on the intra prediction mode of the target block as shown in FIG. 17. After this, the transform kernel candidate among the transform kernel candidates included in the transform subset for the vertical transform kernel, which the AMT vertical flag of the target block indicates, may be derived as the vertical transform kernel of the target block, and the transform kernel candidate among the transform kernel candidates included in the transform subset for the horizontal transform kernel, which the AMT horizontal flag of the target block indicates, may be derived as the horizontal transform kernel of the target block. Meanwhile, the AMT flag may be represented as an MTS flag.

For reference, in an example, the intra prediction mode may include two non-directional (or non-angular) intra prediction modes and 65 directional (or angular) intra prediction modes. The non-directional intra prediction modes may include a No. 0 planar intra prediction mode, and a No. 1 DC intra prediction mode, and the directional intra prediction modes may include 65 intra prediction modes between a No. 2 intra prediction mode and a No. 66 intra prediction mode. However, this is an example, and the present disclosure may be applied to a case where there are different number of intra prediction modes. Meanwhile, according to circumstances, a No. 67 intra prediction mode may be further used, and the No. 67 intra prediction mode may represent a linear model (LM) mode.

Figure 4:
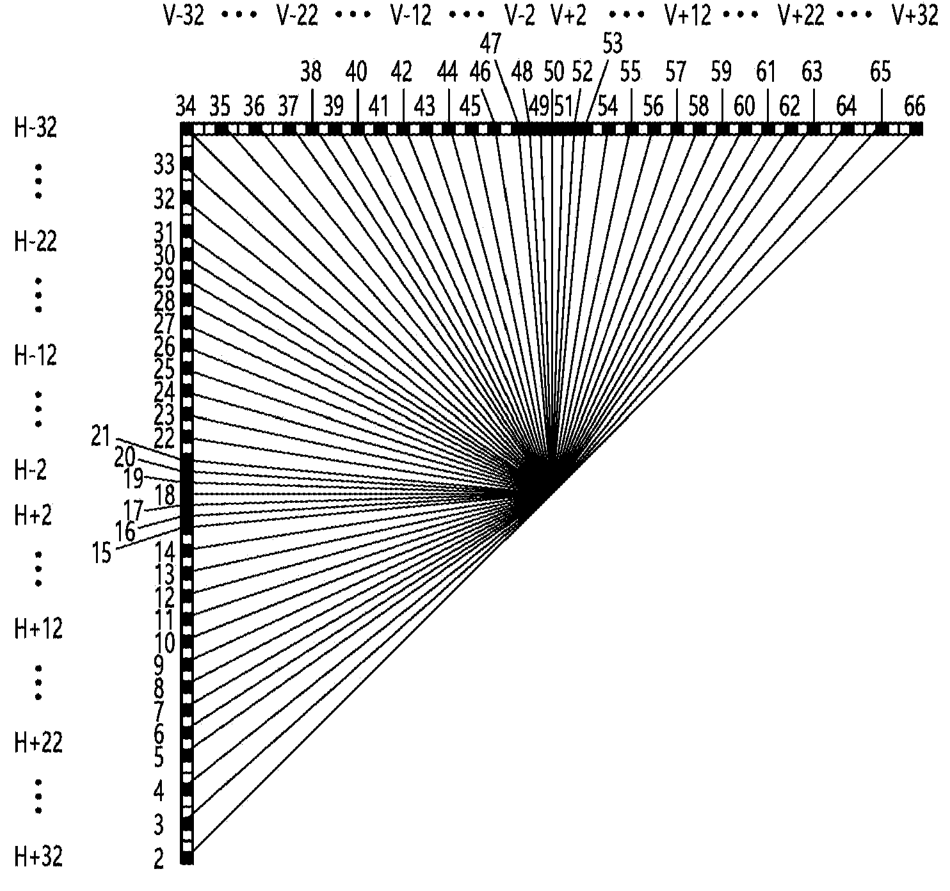
FIG. 4 illustratively represents intra directional modes of 65 prediction directions.

FIG. 4 illustratively represents intra directional modes of 65 prediction directions.

Referring to FIG. 4, based on the No. 34 intra prediction mode having a left upward diagonal prediction direction, the intra prediction mode having a horizontal directionality and the intra prediction mode having vertical directionality may be classified. H and V of FIG. 4 mean horizontal directionality and vertical directionality, respectively, and numerals −32 to 32 indicate displacements in units of 1/32 at sample grid positions. The Nos. 2 to 33 intra prediction modes have horizontal directionality, and the Nos. 34 to 66 intra prediction modes have vertical directionality. The No. 18 intra prediction mode and the No. 50 intra prediction mode represent a horizontal intra prediction mode and a vertical intra prediction mode, respectively, and the No. 2 intra prediction mode may be called a left downward diagonal intra prediction mode; No. 34 intra prediction mode, a left upward diagonal intra prediction mode; and the No. 66 intra prediction mode, a right upward diagonal intra prediction mode.

The transformer may derive (secondary) transform coefficients by performing the secondary transform based on the (primary) transform coefficients (S320). If the first transform was a transform from a space domain to a frequency domain, the secondary transform may be regarded as a transform from a frequency domain to a frequency domain. The secondary transform may include a non-separable transform. In this case, the secondary transform may be called a non-separable secondary transform (NSST), or a mode-dependent non-separable secondary transform (MDNSST). The non-separable secondary transform may represent a transform which generates transform coefficients (or secondary transform coefficients) for a residual signal by secondary-transforming, based on non-separable transform matrix, (primary) transform coefficients derived through the primary transform. At this time, the vertical transform and the horizontal transform are not applied separately (or horizontal and vertical transforms are not applied independently) to the (primary) transform coefficients, but the transforms may be applied at once based on the non-separable transform matrix. In other words, the non-separable secondary transform may represent a transform method in which transform coefficients (or secondary transform coefficients) are generated not by separating vertical and horizontal components of the (primary) transform coefficients but by transforming them together based on the non-separable transform matrix. The non-separable secondary transform may be applied to a top-left region of a block configured with (primary) transform coefficients (hereinafter, may be referred to as a transform coefficient block or a target block). For example, if the width (W) and the height (H) of the transform coefficient block are all equal to or greater than 8, an 8×8 non-separable secondary transform may be applied to a top-left 8×8 region of the transform coefficient block (hereinafter, referred to as a top-left target region). Further, if the width (W) and the height (H) of the transform coefficient block are all equal to or greater than 4, and the width (W) and the height (H) of the transform coefficient block are less than 8, a 4×4 non-separable secondary transform may be applied to a top-left min(8,W)×min(8,H) region of the transform coefficient block.

Specifically, for example, if a 4×4 input block is used, the non-separable secondary transform may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad \text{[Equation 1]}$$

If the X is represented in the form of a vector, the vector $\vec{X}$ may be represented as below.

$$\vec{X} = [X_{00}\ X_{01}\ X_{02}\ X_{03}\ X_{10}\ X_{11}\ X_{12}\ X_{13}\ X_{20}\ X_{21}\ X_{22}\ X_{23}\ X_{30}\ X_{31}\ X_{32}\ X_{33}]^T \quad \text{[Equation 2]}$$

In this case, the secondary non-separable transform may be calculated as below.

$$\vec{F} = T \cdot \vec{X}, \quad \text{[Equation 3]}$$

where $\vec{F}$ represents a transform coefficient vector, and T represents a 16×16 (non-separable) transform matrix.

Through foregoing Equation 3, a 16×1 transform coefficient vector $\vec{F}$ may be derived, and the $\vec{F}$ may be re-organized into a 4×4 block through a scan order (horizontal, vertical, diagonal and the like). However, the above-described calculation is an example, and hypercube-Givens transform (HyGT) or the like may be used for the calculation of the non-separable secondary transform in order to reduce the computational complexity of the non-separable secondary transform.

Meanwhile, in the non-separable secondary transform, a transform kernel (or transform core, transform type) may be selected such that it may be mode dependent. In this case, the mode may include the intra prediction mode and/or the inter prediction mode.

As described above, the non-separable secondary transform may be performed based on an 8×8 transform or a 4×4 transform determined based on the width (W) and the height (H) of the transform coefficient block. That is, the non-separable secondary transform may be performed based on an 8×8 sub-block size or a 4×4 sub-block size. For example, in order to select the mode dependent transform kernel, 35 sets of 3 non-separable secondary transform kernels for the non-separable secondary transform may be configured for the both of the 8×8 sub-block size and the 4×4 sub-block size. That is, 35 transform sets may be configured for the 8×8 sub-block size, and 35 transform sets may be configured for the 4×4 sub-block size. In this case, each of 35 transform sets for the 8×8 sub-block size may include three 8×8 transform kernels, and in this case, each of 35 transform sets for the 4×4 sub-block size may include three 4×4 transform kernels. However, the size of the transform sub-block, the number of the sets, and the number of the transform kernels in the set are examples, and any other size than 8×8 or 4×4 may be used, or n number of sets may be configured, and each set may include k number of kernels.

The transform set may be called an NSST set, and the transform kernel in the NSST set may be called an NSST kernel. The selection of a specific set from among the transform sets may be performed, for example, based on the intra prediction mode of the target block (CU or sub-block).

Figures 18, 19, 20:
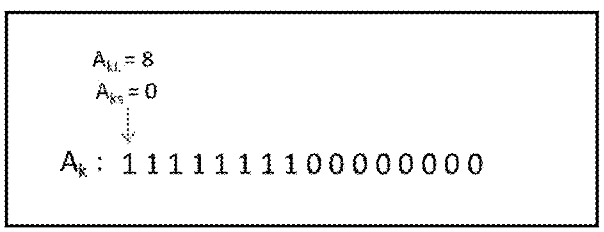
FIG. 18 exemplarily represents mapping between the 35 transform sets and the intra prediction modes.
FIG. 19 exemplarily represents the computational complexity and memory requirement necessary for the separable transform and the non-separable transform.
FIG. 20 exemplarily represents the association vector $A_k$.

In this case, mapping between the 35 transform sets and the intra prediction modes may be, for example, represented as in FIG. 18. For reference, if an LM mode is applied to a target block, the secondary transform may not be applied to the target block.

FIG. 18 exemplarily represents mapping between the 35 transform sets and the intra prediction modes.

Meanwhile, if a specific set is determined to be used, one of k number of transform kernels in the specific set may be selected through the non-separable secondary transform index. The encoding device may derive a non-separable secondary transform index indicating a specific transform kernel based on the rate-distortion (RD) check, and may signal the non-separable secondary transform index to the decoding device. The decoding device may select one from among k number of transform kernels in the specific set based on the non-separable secondary transform index. For example, the NSST index value 0 may indicate a first non-separable secondary transform kernel, the NSST index value 1 may indicate a second non-separable secondary transform kernel, and the NSST index value 2 may indicate a third non-separable secondary transform kernel. Alternatively, the NSST index value 0 may indicate that the first non-separable secondary transform is not applied to a target block, and the NSST index values 1 to 3 may indicate the three transform kernels.

Referring back to FIG. 3, the transformer may perform the non-separable secondary transform based on the selected transform kernels, and may obtain (secondary) transform coefficients. As described above, the transform coefficients may be derived as transform coefficients quantized through the quantizer, and may be encoded and signaled to the decoding device and transferred to the dequantizer/inverse transformer in the encoding device.

Meanwhile, if the secondary transform is omitted, (primary) transform coefficients, which are an output of the primary (separable) transform, may be derived as transform coefficients quantized through the quantizer as described above, and may be encoded and signaled to the decoding device and transferred to the dequantizer/inverse transformer in the encoding device.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S350), and may obtain a residual block (residual samples) by performing a primary (inverse) transform on the (primary) transform coefficients (S360). In this connection, the primary transform coefficients may be called modified transform coefficients from the viewpoint of the inverse transformer. As described above, the encoding device and the decoding device may generate the reconstructed block based on the residual block and the predicted block, and may generate the reconstructed picture based on the reconstructed block.

Meanwhile, as described above, if the secondary (inverse) transform is omitted, (dequantized) transform coefficients may be received, the primary (separable) transform may be performed, and the residual block (residual samples) may be obtained. As described above, the encoding device and the decoding device may generate the reconstructed block based on the residual block and the predicted block, and may generate the reconstructed picture based on the reconstructed block.

Figure 5A:
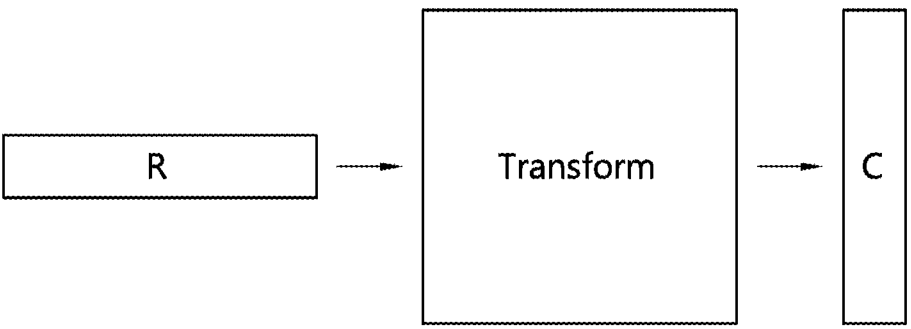
FIGS. 5A to 5C are diagrams for explaining a selective transform according to an example of the present disclosure.
Figure 5B:
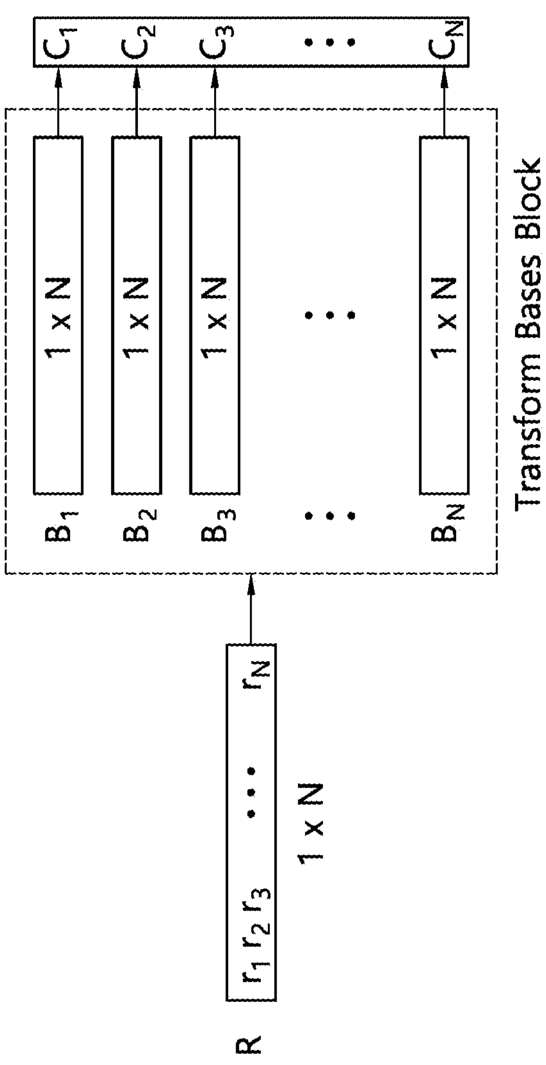
Figure 5C:
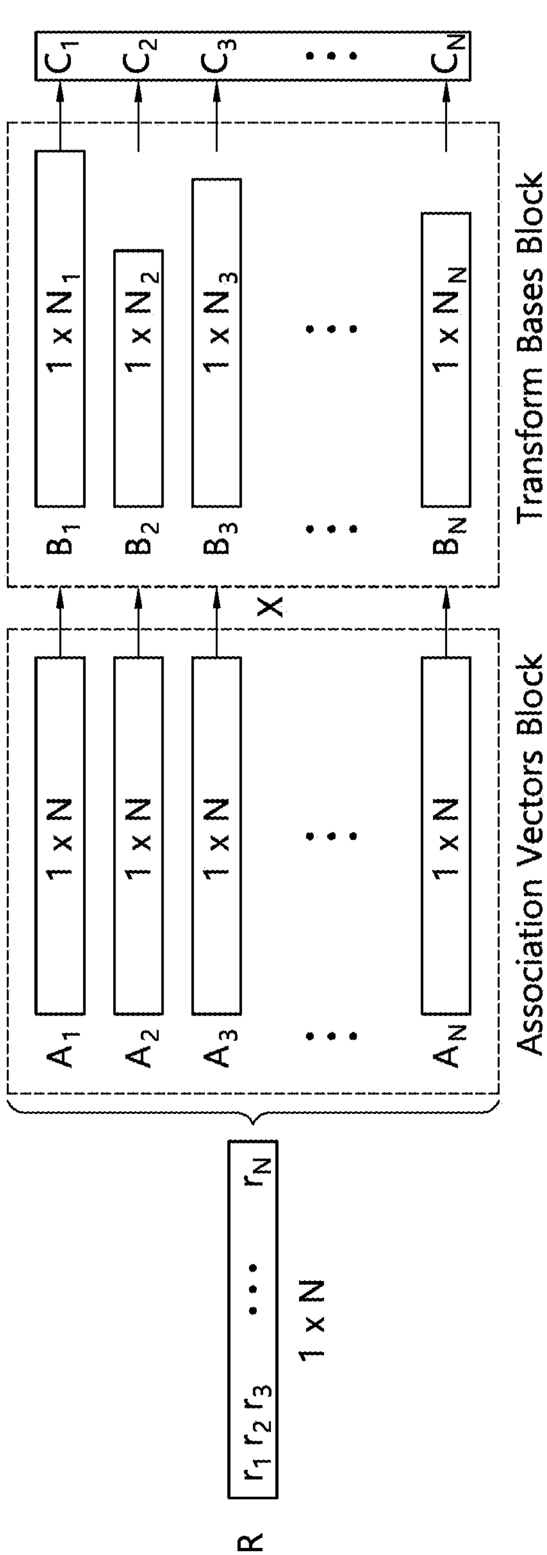

FIGS. 5A to 5C are diagrams for explaining a selective transform according to an example of the present disclosure.

In the present specification, the term "target block" may mean a current block or a residual block on which coding is performed.

FIG. 5A represents an example where transform coefficients are derived through a transform.

The transform in video coding may represent a process through which a transform coefficient vector C for an input vector R is generated by transforming the input vector R based on a transform matrix as shown in FIG. 5A. The input vector R may represent primary transform coefficients. Alternatively, the input vector R may represent a residual vector, that is, residual samples. Meanwhile, the transform coefficient vector C may be represented as an output vector C.

FIG. 5B represents a specific example where transform coefficients are derived through a transform. FIG. 5B specifically represents the transform process shown in FIG. 5A. As described above in FIG. 3, in the non-separable secondary transform (hereinafter, referred to as 'NSST'), after dividing into M×M blocks the block data of transform coefficients obtained by applying the primary transform, $M^2 \times M^2$ NSST may be performed on each M×M block. For example, the M may be 4 or 8, but is not limited to this. The $M^2$ may be N. In this case, as shown in FIG. 5B, the input vector R may be a (1×N)-dimensional vector including (primary) transform coefficients $r_1$ to $r_N$, and the transform coefficient vector C may be a (N×1)-dimensional vector including transform coefficients $c_1$ to $c_N$. That is, the input vector R may include N number of (primary) transform coefficients $r_1$ to $r_N$, and the size of the input vector R may be 1×N. Further, the transform coefficient vector C may include N number of transform coefficients $c_1$ to $c_N$, and the size of the transform coefficient vector C may be N×1.

In order to derive the transform coefficient vector C, the input vector R may go through the transform matrix. That is, the input vector R may be derived as the transform coefficient vector C based on the transform matrix.

Meanwhile, the transform matrix may include N number of basis vectors $B_1$ to $B_N$. As shown in FIG. 5B, the basis vectors $B_1$ to $B_N$ may be (1×N)-dimensional vectors. That is, the size of the basis vectors $B_1$ to $B_N$ may be (1×N). The transform coefficient vector C may be generated based on the (primary) transform coefficients of the input vector R and each of the basis vectors of the transform matrix. For example, the inner product between the input vector and each of the basis vectors may be derived as the transform coefficient vector C.

Meanwhile, in the above-described transform, two main issues occur. Specifically, high computational complexity relating to the times of multiplications and additions required to generate the output vector, and memory requirement for storing the generated coefficients may occur as main issues.

For example, the computational complexity and memory requirement necessary for the separable transform and the non-separable transform may be derived as shown in FIG. 19.

FIG. 19 exemplarily represents the computational complexity and memory requirement necessary for the separable transform and the non-separable transform.

Referring to FIG. 5, the memories required for storing the coefficients generated through the separable transform may be $N^2$, and the times of computations may be $2N^3$. The times of computations indicates the computational complexity. Further, the memories required for storing the coefficients generated through the non-separable transform may be $N^4$, and the times of computations may be $N^4$. The times of computations indicates the computational complexity. That is, the greater the times of computations, the higher the computational complexity, and the less the times of computations, the lower the computational complexity.

As shown in FIG. 19, the memory requirement and the times of computations for the non-separable transform may greatly increase when compared to the separable transform. Further, as the size of a target block, which the non-separable transform is performed on, increases, that is, as the N becomes greater, the difference between the memory requirement and the times of computations for the separable transform and the memory requirement and the times of computations for the non-separable transform may become greater.

The non-separable transform provides a better coding gain when compared to the separable transform, but as shown in FIG. 19, due to the computational complexity of the non-separable transform, the non-separable transform was not used in existing video coding standards, and since the computational complexity of the separable transform also increases with the increase in the size of a target block, in the existing HEVC standard the separable transform was proposed to be used only in a target block whose size is a 32×32 size or less.

Accordingly, the present disclosure proposes a selective transform. The selective transform may greatly decrease the computational complexity and the memory requirement, through which such effects as the increase in efficiency of a compute intensive transform block and improvement of the coding efficiency may be achieved. That is, the selective transform may be used to address the computational complexity issue occurring at the non-separable transform or the transform of a block of a great size. The selective transform may be used to any type of transform such as the primary transform (or may be referred to as a core transform), the secondary transform or the like. For example, the selective transform may be applied as the core transform for the encoding device/decoding device, and may have an effect of greatly decreasing the encoding time/decoding time.

FIG. 5C represents an example where transform coefficients are derived through the selective transform. The selective transform may mean a transform which is performed on a target block based on a transform matrix including a basis vector with a selective number of elements.

The reduced transform is a method which, since there may be included an element among N number of elements of the basis vector of the transform matrix, which is redundant or not important, has been proposed with the motivation to be capable of reducing the computational complexity and the memory requirement by excluding the element. For example, referring to FIG. 5C, among N number of elements of the basis vector $B_1$, $Z_0$ number of elements may not be important elements, and in this case, a truncated basis vector $B_1$ may be derived which includes only $N_1$ number of elements. Here, the $N_1$ may be $N-Z_0$. The truncated basis vector $B_1$ may be represented as a modified basis vector $B_1$.

Referring to FIG. 5C, if the modified basis vector $B_1$ is applied as a part of the transform matrix to the input vector R, the transform coefficient $C_1$ may be derived. From an experiment result, it is observed that the transform coefficient $C_1$ is the same value as the transform coefficient $C_1$ derived by applying the existing basis vector $B_1$ as a part of the transform matrix to the input vector R. That is, by deriving a result under the assumption that an unimportant element of the each basis vector is 0, it is possible to greatly reduce the times of necessary multiplications without making a great difference in results. Further, then it is possible to decrease the number of elements (that is, elements of a transform matrix) that must be stored for this computation.

In order to define a position of an element among elements of the basis vector, which is not important (or meaningful), an association vector is proposed. In order to derive the modified $N_1$-dimensional basis vector $B_1$, a (1×N)-dimensional association vector $A_1$ may be considered. That is, in order to derive the modified basis vector $B_1$ of $1\times N_1$ size (i.e., modified basis vector $B_1$ including $N_1$ number of elements), the association vector $A_1$ of 1×N size may be considered.

Referring to FIG. 5C, values derived by applying the association vector for each of the basis vectors $B_1$ to $B_N$ to the input vector R may be transferred to the basis vectors. Through this, only some elements of the input vector R may be computed with the element of the basis vector. Specifically, the association vector may include 0 and 1, and an operation is performed such that the element selected from among the elements of the input vector R is multiplied with 1 and the element not selected therefrom is multiplied with 0 so that the only selected elements may go through it and be transferred to the basis vector.

For example, the association vector $A_1$ may be applied to the input vector R, and only $N_1$ number of elements among the elements of the input vector R, which have been designated by the association vector $A_1$, may be used to calculate an inner product with the basis vector $B_1$. The inner product may represent $C_1$ of the transform coefficient vector C. In this connection, the basis vector $B_1$ may include $N_1$ number of elements, and the $N_1$ may be N or less. The above-described operation of the association vector $A_1$ and the basis vector $B_1$ with the input vector R may be performed on the association vectors $A_2$ to $A_N$ and the basis vectors $B_2$ to $B_N$.

Since the association vector includes only 0 and/or 1, the binary values, there may be an advantage in storing the association vector. 0 of the association vector may indicate that the element of the input vector R for the 0 is not transferred to the transform matrix for the inner product calculation, and 1 of the association vector may indicate that the element of the input vector R for the 1 is transferred to the transform matrix for the inner product calculation. For example, the association vector $A_k$ of 1×N size may include $A_{k1}$ to $A_{kn}$. If $A_{kn}$ of the association vector $A_k$ is 0, $r_n$ of the input vector R may not be allowed to go through. That is, $r_n$ of the input vector R may not be transferred to the transform vector $B_n$. Further, if the $A_{kn}$ is 1, $r_n$ of the input vector R may be allowed to go through. That is, $r_n$ of the input vector R may be transferred to the transform vector $B_n$, and may be used in computation for deriving $c_n$ of the transform coefficient vector C.

Figure 6:
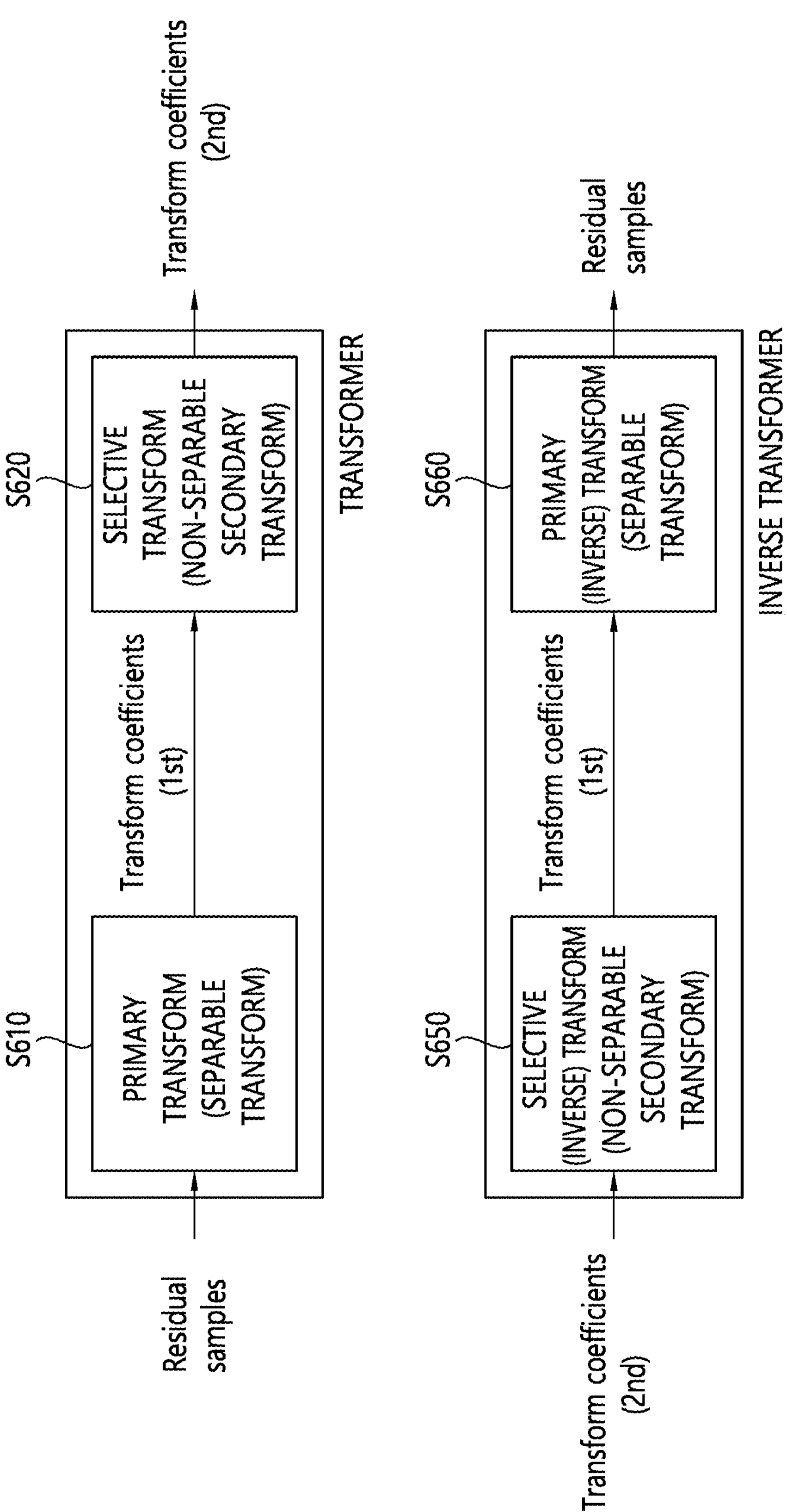
FIG. 6 schematically represents a multiple transform technique in which the selective transform is applied as a secondary transform.

FIG. 6 schematically represents a multiple transform technique in which the selective transform is applied as a secondary transform.

Referring to FIG. 6, a transformer may correspond to the transformer in the encoding device of foregoing FIG. 1, and an inverse transformer may correspond to the inverse transformer in the encoding device of foregoing FIG. 1, or the inverse transformer in the decoding device of foregoing FIG. 2.

The transformer may derive (primary) transform coefficients by performing primary transform based on residual samples (residual sample array) in a residual block (S610). Here, the first transform may include the above-described AMT.

If the adaptive multiple core transform is applied, transform coefficients (or primary transform coefficients) may be generated by applying transform from a space domain to a frequency domain for a residual signal (or residual block) based on the DCT type 2, the DST type 7, the DCT type 8, and/or DST type 1. In this connection, the primary transform coefficients may be called temporary transform coefficients from the viewpoint of the transformer. Further, the DCT type 2, the DST type 7, the DCT type 8, and the DST type 1 may be called a transform type, transform kernel or transform core. For reference, the DCT/DST transform types may be defined based on basis functions, and the basis functions may be represented as in FIG. 15. Specifically, the process of deriving the primary transform coefficients by applying the adaptive multiple core transform is as described above.

The transformer may derive (secondary) transform coefficients by performing the selective transform based on the (primary) transform coefficients (S620). The selective transform may mean a transform which is performed on the (primary) transform coefficients for a target block based on the transform matrix including the modified basis vector and the association matrix including the association vector for the basis vector. The modified basis vector may represent the basis vector including N or less number of elements. That is, the modified basis vector may represent the basis vector including a specific number of elements selected from among N number of elements. For example, the modified basis vector $B_n$ may be a $(1\times N_n)$-dimensional vector, and the $N_n$ may be less or equal to the N. That is, the modified basis vector $B_n$ may be a $(1\times N_n)$ size, and the $N_n$ may be less or equal to the N. Here, the N may be the multiplication of the height and the width of a top-left target region of the target block to which the selective transform is applied. Alternatively, the N may be the total number of the transform coefficients of a top-left target region of the target block to which the selective transform is applied. Meanwhile, the transform matrix including the modified basis vector may be represented as a modified transform matrix. Further, the transform matrix may be represented as a transform bases block (TBB), and the association matrix may be represented as an association vectors block (AVB).

The transformer may perform the selective transform based on the modified transform matrix and the association matrix, and obtain (secondary) transform coefficients. As described above, the transform coefficients may be derived as transform coefficients quantized through the quantizer, and may be encoded and signaled to the decoding device and transferred to the dequantizer/inverse transformer in the encoding device.

The inverse transformer may perform a series of procedures in the inverse order to that in which they have been performed in the above-described transformer. The inverse transformer may receive (dequantized) transformer coefficients, and derive (primary) transform coefficients by performing the selective (inverse) transform (S650), and may obtain a residual block (residual samples) by performing a primary (inverse) transform on the (primary) transform coefficients (S660). In this connection, the primary transform coefficients may be called modified transform coefficients from the viewpoint of the inverse transformer. As described above, the encoding device and the decoding device may generate the reconstructed block based on the residual block and the predicted block, and may generate the reconstructed picture based on the reconstructed block.

Meanwhile, the present disclosure proposes a selective transform combined with a reduced transform as an example of the selective transform.

In the present specification, the term "reduced transform" may mean a transform which is performed on residual samples for a target block based on a transform matrix whose size is reduced according to a reduced factor.

In the reduced transform according to an example, an N-dimensional vector may be mapped to an R-dimensional vector located in another space, so that the reduced transform matrix may be determined, where R is less than N. That is, the reduced transform may mean a transform which is performed on the residual samples for a target block based on the reduced transform matrix including R number of basis vectors. Here, N may mean the square of the length of a side of a block (or target region) to which the transform is applied, or the total number of transform coefficients corresponding to a block (or target region) to which the transform is applied, and the reduced factor may mean an R/N value. The reduced factor may be referred to as a reduced factor, a reduction factor, a simplified factor, simple factor and other various terms. Meanwhile, the R may be referred to as a reduced coefficient, but according to circumstances, the reduced factor may mean the R. Further, according to circumstances, the reduced factor may mean the N/R value.

The size of the reduced transform matrix according to an example may be R×N less than N×N, the size of a conventional transform matrix, and may be defined as in Equation 4 below.

$$T_{R\times N}=\begin{bmatrix} t_{11} & t_{12} & t_{13} & \dots & t_{1N} \\ t_{21} & t_{22} & t_{23} & & t_{2N} \\ & \vdots & & \ddots & \vdots \\ t_{R1} & t_{R2} & t_{R3} & \dots & t_{RN} \end{bmatrix} \quad \text{[Equation 4]}$$

If a reduced transform matrix $T_R\times N$ is multiplied to the transform coefficients to which the primary transform of a target block has been applied, the (secondary) transform coefficients for the target block may be derived.

If the RST is applied, then since the reduced transform matrix of an R×N size is applied to the secondary transform, the transform coefficients R+1 to N may become 0 implicitly. In other words, if the transform coefficient of the target block is derived by applying the RST, the values of the transform coefficients R+1 to N may be 0. Here, the transform coefficients R+1 to N may represent the $(R+1)^{th}$ transform coefficient to the $N^{th}$ transform coefficient among transform coefficients. Specifically, arrangement of transform coefficients of a target block may be explained as follows.

Figure 7:
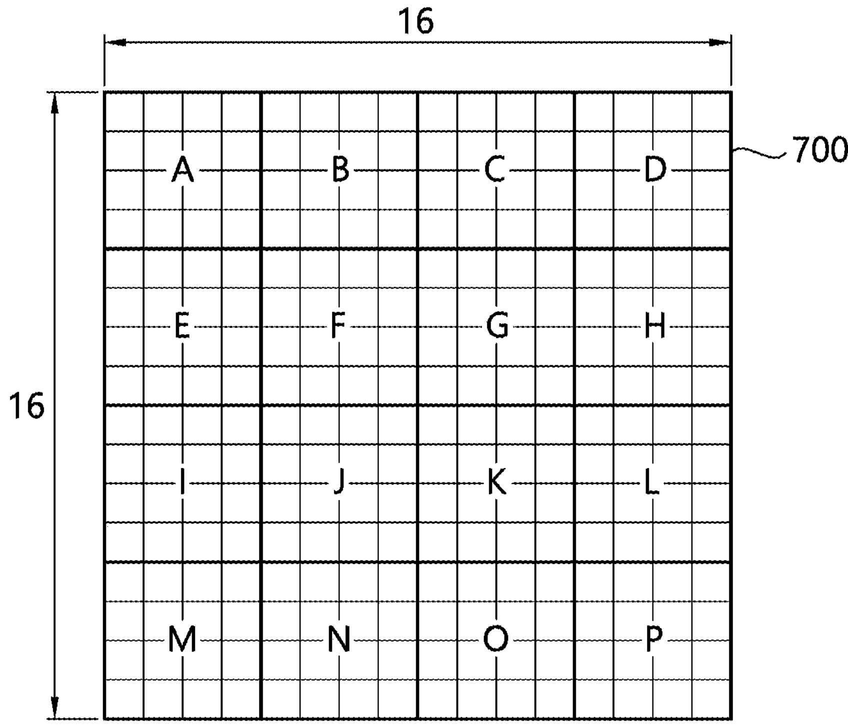
FIG. 7 is an diagram for explaining arrangement of transform coefficients based on a target block according to an example of the present disclosure.

FIG. 7 is a diagram for explaining arrangement of transform coefficients based on a target block according to an example of the present disclosure. Hereinafter, explanations about a transform to be described later in FIG. 7 may be applied similarly to an inverse transform. The NSST based on the primary transform and the reduced transform may be performed on a target block (or residual block) 700. In an example, a 16×16 block shown in FIG. 7 may represent a target block 700, and 4×4 blocks labeled with A to P may represent sub-blocks of the target block 700. The primary transform may be performed on the entire scope of the target block 700, and after the primary transform has been performed, the NSST may be applied to 8×8 block consisting of sub-groups A, B, E and F (hereinafter, top-left target region). At this time, if the NSST based on the reduced transform is performed, then since only R (herein, R means the reduced coefficient, and R is less than N) number of NSST transform coefficients are derived, the $(R+1)^{th}$ NSST transform coefficient to the Nth NSST transform coefficient may be determined as 0. For example, if R is 16, the 16 transform coefficients which have been derived by performing the NSST based on the reduced transform may be allocated to respective blocks included in the sub-group A which is a top-left 4×4 block included in the top-left target region of the target block 700, and the transform coefficient 0 may be allocated to each of the N−R number of, i.e., 64−16=48, blocks included in the sub-groups B, E and F. The primary transform coefficients on which the NSST based on the reduced transform has not been performed may be allocated to respective blocks included in the sub-groups C, D, G, H, I, J, K, L, M, N, O and P.

Figure 8:
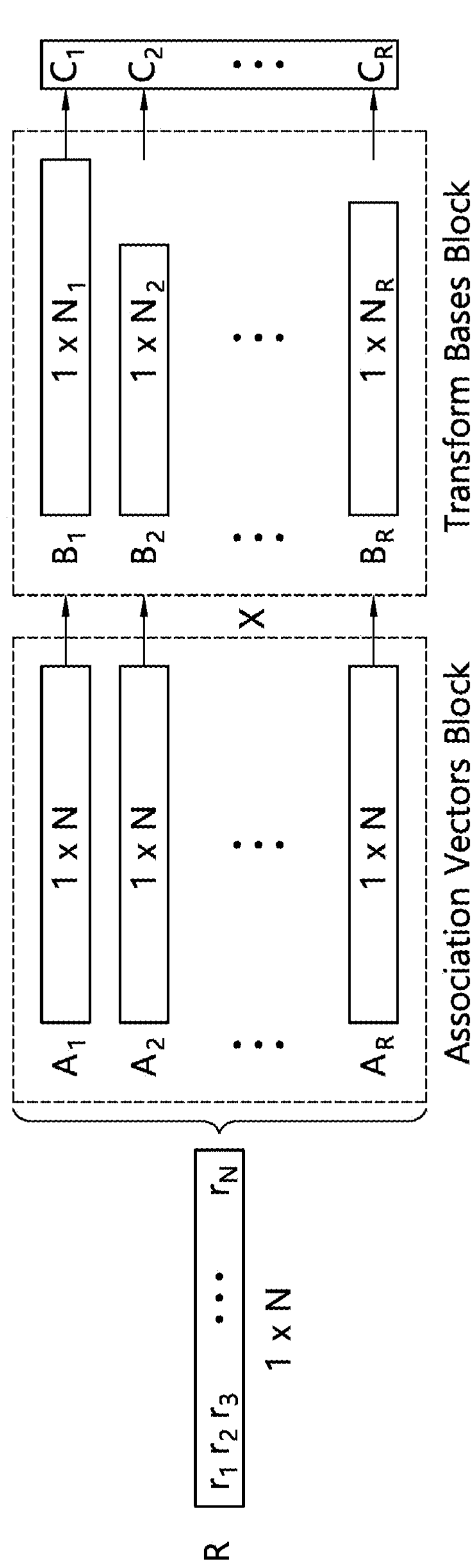
FIG. 8 represents an example where transform coefficients are derived through a transform in which the reduced transform and the selective transform are combined with each other.

FIG. 8 represents an example where transform coefficients are derived through a transform in which the reduced transform and the selective transform are combined with each other. Referring to FIG. 8, the transform matrix may include R number of the basis vectors, and the association matrix may include R number of the association vectors. Here, the transform matrix including the R number of the basis vectors may be represented as a reduced transform matrix, and the association matrix including the R number of the association vectors may be represented as a reduced association matrix.

Further, each of the basis vectors may include only elements selected from among N number of elements. For example, referring to FIG. 8, a basis vector $B_1$ may be a $1\times N_1$ dimensional vector including $N_1$ number of elements, a basis vector $B_2$ may be a $1\times N_2$ dimensional vector including $N_2$ number of elements, and a basis vector $B_R$ may be a $1\times N_R$ dimensional vector including $N_R$ number of elements. The $N_1$, $N_2$ and $N_R$ may be values equal to or less than the N. The transform in which the reduced transform and the selective transform are combined with each other may be used in any type of transform such as the secondary transform, the primary transform and the like.

Referring to FIG. 8, the encoding device and the decoding device may apply as the secondary transform the transform in which the reduced transform and the selective transform are combined with each other. For example, the selective transform may be performed based on the reduced transform matrix including the modified basis vector and the reduced association matrix, and (secondary) transform coefficients may be obtained. Further, in order to reduce the computational complexity of the selective transform, the hypercube-Givens transform (HyGT) or the like may be used for the calculation of the selective transform.

Figure 9:
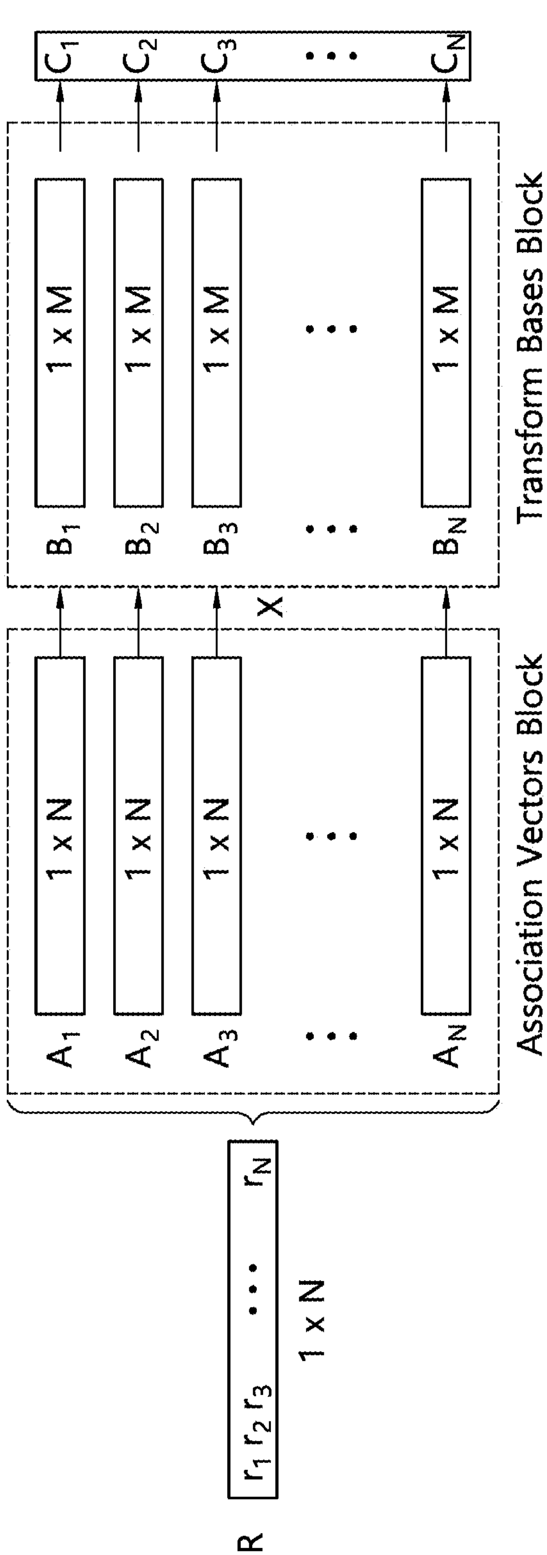
FIG. 9 represents an example where transform coefficients are derived through the selective transform.

FIG. 9 represents an example where transform coefficients are derived through the selective transform. In an example with regard to the selective transform, there may be no pattern for the association vectors $A_1, A_2, \ldots A_N$ of the association matrix, and the association vectors may be derived in different forms from each other. Alternatively, in another example with regard to the selective transform, the association vectors $A_1, A_2, \ldots A_N$ of the association matrix may be derived in the same form.

Specifically, for example, the respective association vectors may have the same number of 1's. For example, if the number of 1's is M, the association vectors may have M number of 1's and (N−M) number of 0's. In this case, M number of the transform coefficients among the (primary) transform coefficients of the input vector R may be transferred to the basis vectors. Therefore, the length of the basis vectors may also be M. That is, as shown in FIG. 9, the respective basis vectors may include M number of elements, may be (1×M)-dimensional vectors, and may be derived as $N_1=N_2=\ldots=N_N=M$. An association matrix and a modified transform matrix architecture shown in FIG. 9 may be represented as a symmetric architecture with the selective transform.

Further, in another example, there may be a specific pattern of elements whose values are 1, and the pattern may be repeated, rotated and/or translated in an arbitrary manner, so that the association vectors may be derived.

Meanwhile, the above-described selective transform may be applied together with other transform techniques as well as with the reduced transform and/or the HyGT.

Further, the present disclosure proposes a method of simplifying the association vector in the above-described selective transform. By simplifying the association vector, the storing of information for performing the selective transform and handling of the selective transform may be further improved. That is, the memory load for performing the selective transform may be decreased, and the handling capability of the selective transform may be further improved.

The effects resulting from the simplification of the association vector may be exhibited more clearly if elements among elements included in the association vector, which are not 0, have a continuous distribution. For example, the association vector $A_k$ may include a continuous string of 1's. In this case, the $A_k$ may be represented through two factors $A_{ks}$ and $A_{kL}$. That is, the association vector $A_k$ may be derived based on the factors $A_{ks}$ and $A_{kL}$. Here, the $A_{ks}$ may be a factor representing a starting point of non-zero elements (for example, 1's), and the $A_{kL}$ may be a factor representing the length of the non-zero elements. The association vector $A_k$ represented based on the factors may be derived as in FIG. 20.

FIG. 20 exemplarily represents the association vector $A_k$.

Referring to FIG. 20, the association vector $A_k$ may include 16 elements. That is, the association vector $A_k$ may be a 1×16 dimensional vector. The value of the factor $A_{ks}$ representing the starting point of the non-zero elements in the association vector $A_k$ may be derived as 0, and in this case, the factor $A_{ks}$ may indicate the first element of the association vector $A_k$ as the starting point of the non-zero elements. Further, The value of the factor $A_{kL}$ representing the length of the non-zero elements in the association vector $A_k$ may be derived as 8, and in this case, the factor $A_{kL}$ may indicate the length of the non-zero elements as 8. Therefore, the $A_k$ may be derived based on the factors as a vector in which first to eighth elements are 1, and the rest of the elements are 0 as shown in FIG. 20.

Figure 10:
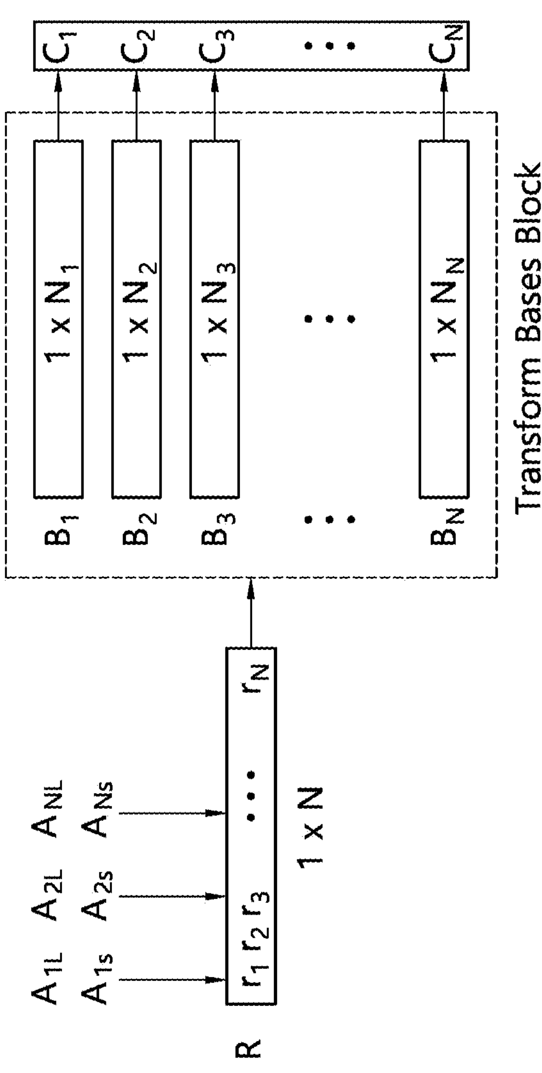
FIG. 10 represents an example where the selective transform is performed deriving an association vector based on the two factors for the association vector.

FIG. 10 represents an example where the selective transform is performed deriving an association vector based on the two factors for the association vector. Referring to FIG. 10, the association matrix may be derived based on the factors for each of the association vectors, and transform coefficients for a target block may be derived based on the association matrix and the modified transform matrix.

Meanwhile, the starting point of non-zero elements in each of association vectors, and the number of the non-zero elements may be derived as fixed values, or the starting point of non-zero elements in each of the association vectors, and the number of the non-zero elements may be derived variously.

Further, for example, the starting point of non-zero elements in an association vector, and the number of the non-zero elements may be derived based on the size of a top-left target region on which a transform is performed. Here, the size of the top-left target region may represent the number of transform coefficients of the top-left target region, or may represent the multiplication of the height and the width of the top-left target region. Further, in another example, the starting point of non-zero elements in an association vector, and the number of the non-zero elements may be derived based on an intra prediction mode of a target block. Specifically, for example, the starting point of the non-zero elements in the association vector and the number of the non-zero elements may be derived based on whether the intra prediction mode of the target block is a non-directional intra prediction mode.

Alternatively, for example, the starting point of non-zero elements in an association vector, and the number of the non-zero elements may be predetermined. Alternatively, for example, information representing the starting point of the non-zero elements in the association vector, and the information representing the number of the non-zero elements may be signaled, and the association vector may be derived based on the information representing the starting point of the non-zero elements and the information representing the number of the non-zero elements. Alternatively, other information may be used instead of the information representing the starting point of the non-zero elements. For example, instead of the information representing the starting point of the non-zero elements, information representing the last position of the non-zero elements may be used, and the association vector may be derived based on the information representing the last position of the non-zero elements.

Meanwhile, the method of deriving the association vector based on the factors may also be applied to a separable transform, and a non-separable transform such as a reduced transform HyGT.

Figure 11:
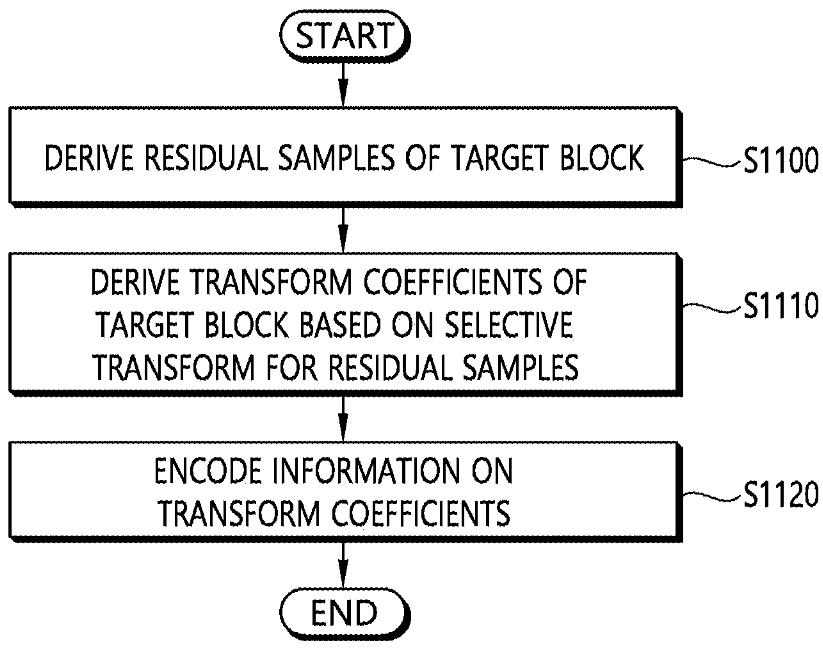
FIG. 11 schematically represents an image encoding method by an encoding device according to the present disclosure.

FIG. 11 schematically represents an image encoding method by an encoding device according to the present disclosure. The method disclosed in FIG. 11 may be performed by the encoding device disclosed in FIG. 1. Specifically, for example, S1100 in FIG. 11 may be performed by the subtractor of the encoding device; S1110, by the transformer of the encoding apparatus; and S1120, by the entropy encoder of the encoding device. Further, although not shown, a process of deriving a prediction sample may be performed by the predictor of the encoding device.

The encoding device derives the residual samples of a target block (S1100). For example, the encoding device may determine whether to perform inter prediction or intra prediction on a target block, and may determine specific inter prediction mode or specific intra prediction mode based on RD cost. According to the determined mode, the encoding device may derive the prediction samples for the target block, and may derive the residual samples through the addition of the prediction samples with the original samples for the target block.

The encoding device derives transform coefficients of the target block based on the selective transform for the residual samples (S1110). The selective transform may be performed based on a modified transform matrix, the modified transform matrix is a matrix including a modified basis vector, and the modified basis vector may include a specific number of elements selected from among N elements. Further, the selective transform may be performed on a top-left target region of the target block, and the N may be the number of residual samples located in the top-left target region. Further, the N may be a value obtained by multiplying the width and the height of the top-left target region. For example, the N may be 16 or 64.

The encoding device may derive modified transform coefficients by performing core transform on the residual samples, and may derive transform coefficients of the target block by performing the selective transform on modified transform coefficients located in a top-left target region of the target block based on an association matrix including an association vector for the modified basis vector and the modified transform matrix.

Specifically, a core transform for the residual samples may be performed as follows. The encoding device may determine whether to apply an adaptive multiple core transform (AMT) to the target block. In this case, an AMT flag may be generated which represents whether the adaptive multiple core transform of the target block is applied. If the AMT is not applied to the target block, the encoding device may derive DCT type 2 as a transform kernel for the target block, and may derive the modified transform coefficients by performing a transform on the residual samples based on the DCT type 2.

If the AMT is applied to the target block, the encoding device may configure a transform subset for a horizontal transform kernel, and a transform subset for a vertical transform kernel, may derive a horizontal transform kernel and a vertical transform kernel based on the transform subsets, and may derive modified transform coefficients by performing a transform on the residual samples based on the horizontal transform kernel and the vertical transform kernel. In this regard, the transform subset for a horizontal transform kernel and the transform subset for a vertical transform kernel may include DCT type 2, DST type 7, DCT type 8, and/or DST type 1 as a candidate. Further, transform index information may be generated, and the transform index information may include an AMT horizontal flag indicating the horizontal transform kernel, and an AMT vertical flag indicating the vertical transform kernel. Meanwhile, the transform kernel may be called a transform type or a transform core.

If the modified transform coefficients are derived, the encoding device may derive the transform coefficients of the target block by performing the selective transform on modified transform coefficients located in a top-left target region of the target block based on an association matrix including an association vector for the modified basis vector and the modified transform matrix. Other modified transform coefficients than the modified transform coefficients located in the top-left region of the target block may be derived as the transform coefficients of the target block without any change.

Specifically, modified transform coefficients for elements with value 1 of the association vector among the modified transform coefficients located in the top-left target region may be derived, and transform coefficient of the target block may be derived based on the modified basis vector and the derived modified transform coefficients. In this connection, the association vector for the modified basis vector may include N number of elements, the N number of elements may include elements with value 1 and/or elements with value 0, and the number of the elements with value 1 may be A. Further, the modified basis vector may include the A number of elements.

Meanwhile, in one example, the modified transform matrix may include N number of modified basis vectors, and the association matrix may include N number of association vectors. The association vectors may include the same number of elements with value 1, and the modified basis vectors may all include the same number of elements. Alternatively, the association vectors may not include the same number of elements with value 1, and the modified basis vectors may not all include the same number of elements.

Alternatively, in another example, the modified transform matrix may include R number of modified basis vectors, and the association matrix may include R number of association vectors. The R may be a reduced coefficient, and the R may be less than N. The association vectors may include the same number of elements with value 1, and the modified basis vectors may all include the same number of elements. Alternatively, the association vectors may not include the same number of elements with value 1, and the modified basis vectors may not all include the same number of elements.

Meanwhile, the association vector may be configured such that elements with value 1 are arranged continuously. In this case, in one example, information on the association vector may be entropy encoded. For example, the information on an association vector may include information representing a starting point of elements with value 1, and information representing the number of elements with value 1. Alternatively, for example, the information on an association vector may include information representing a last position of elements with value 1, and information representing the number of elements with value 1.

Further, in another example, the association vector may be derived based on the size of the top-left target region. For example, a starting point of elements with value 1 in the association vector and the number of the elements with value 1 may be derived based on the size of the top-left target region.

Alternatively, in another example, the association vector may be derived based on the intra prediction mode of the target block. For example, a starting point of elements with value 1 in the association vector and the number of the elements with value 1 may be derived based on the intra prediction mode. Further, for example, the starting point of elements with value 1 in the association vector and the number of the elements with value 1 may be derived based on whether the intra prediction mode is a non-directional intra prediction mode.

The encoding device encodes information on transform coefficients (S1330). The information on transform coefficients may include information on the size, the position or the like of the transform coefficients. Further, as described above, the information on an association vector may be entropy encoded. For example, the information on an association vector may include information representing a starting point of elements with value 1, and information representing the number of elements with value 1. Alternatively, for example, the information on an association vector may include information representing a last position of elements with value 1, and information representing the number of elements with value 1.

Image information including the information on transform coefficients and/or the information on an association vector may be output in the form of a bitstream. Further, the image information may further include prediction information. The prediction information may include an information on motion information (e.g., when the inter prediction is applied) and a prediction mode information as a plurality of informations related to the prediction procedure.

The output bitstream may be transmitted to the decoding device through a storage medium or a network.

Figure 12:
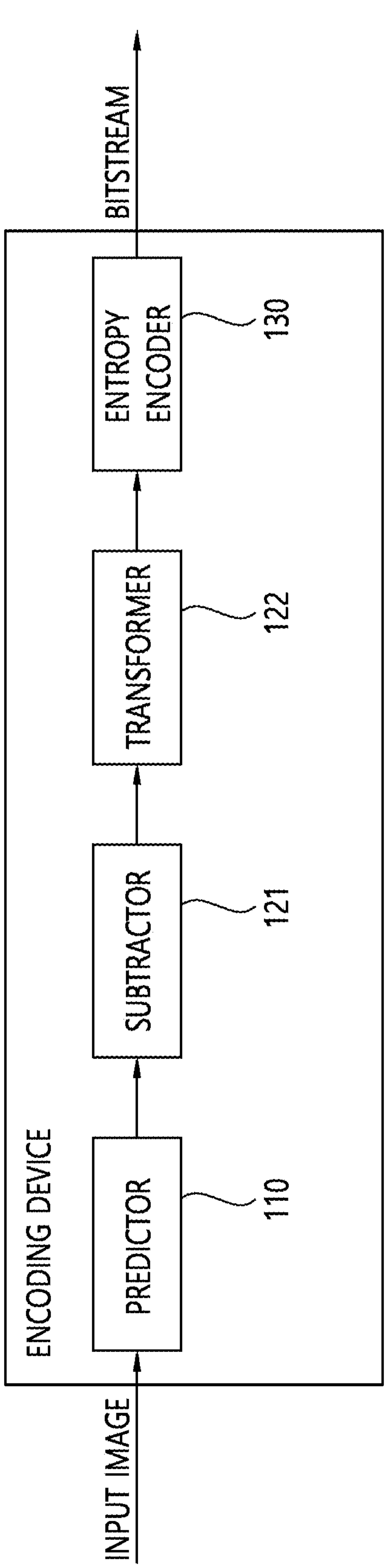
FIG. 12 schematically represents an encoding device performing an image encoding method according to the present disclosure.

FIG. 12 schematically represents an encoding device performing an image encoding method according to the present disclosure. The method disclosed in FIG. 11 may be performed by the encoding device disclosed in FIG. 12. Specifically, for example, an adder of the encoding device of FIG. 12 may perform S1100 in FIG. 11, a transformer of the encoding device may perform S1110, and an entropy encoder of the encoding device may perform S1120 to S1130. Further, although not shown, a process of deriving a prediction sample may be performed by the predictor of the encoding device.

Figure 13:
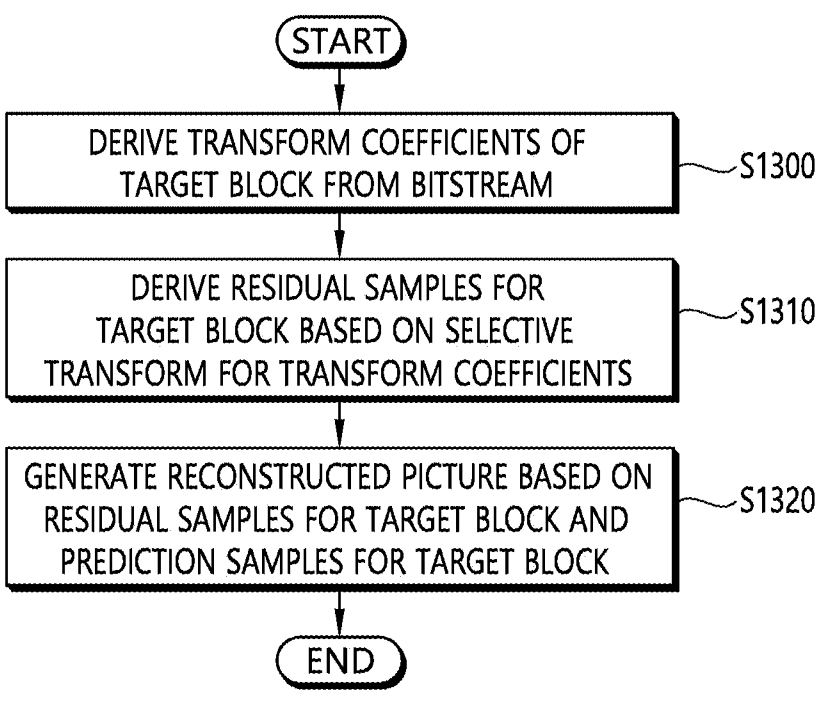
FIG. 13 schematically represents an image decoding method by a decoding device according to the present disclosure.

FIG. 13 schematically represents an image decoding method by a decoding device according to the present disclosure. The method disclosed in FIG. 13 may be performed by the decoding device disclosed in FIG. 2. Specifically, for example, S1300 to S1310 in FIG. 13 may be performed by the entropy decoder of the decoding device; S1320, by the inverse transformer of the decoding device; and S1330, by the adder of the decoding device. Further, although not shown, a process of deriving a prediction sample may be performed by the predictor of the decoding device.

The decoding device derives transform coefficients of the target block from the bitstream (S1300). The decoding device may derive the transform coefficients of the target block by decoding information on the transform coefficients of the target block received through the bitstream. The received information on the transform coefficients of the target block may be represented as a residual information.

The decoding device derives residual samples for the target block based on the selective transform for the transform coefficients (S1310). The selective transform may be performed based on a modified transform matrix, the modified transform matrix is a matrix including a modified basis vector, and the modified basis vector may include a specific number of elements selected from among N elements. Further, the selective transform may be performed on transform coefficients located in the top-left target region of the target block, and the N may be the number of the transform coefficients located in the top-left target region. Further, the N may be a value obtained by multiplying the width and the height of the top-left target region. For example, the N may be 16 or 64.

The decoding device may derive modified transform coefficients by performing the selective transform on the transform coefficients located in the top-left target region of the target block based on an association matrix including an association vector for the modified transform matrix and the modified basis vector.

Specifically, transform coefficients for elements with value 1 of the association vector among transform coefficients located in the top-left target region may be derived, and modified transform coefficient may be derived based on the derived transform coefficients and the modified basis vector. In this connection, the association vector for the modified basis vector may include N number of elements, the N number of elements may include elements with value 1 and/or elements with value 0, and the number of the elements with value 1 may be A. Further, the modified basis vector may include the A number of elements.

Meanwhile, in one example, the modified transform matrix may include N number of modified basis vectors, and the association matrix may include N number of association vectors. The association vectors may include the same number of elements with value 1, and the modified basis vectors may all include the same number of elements. Alternatively, the association vectors may not include the same number of elements with value 1, and the modified basis vectors may not all include the same number of elements.

Alternatively, in another example, the modified transform matrix may include R number of modified basis vectors, and the association matrix may include R number of association vectors. The R may be a reduced coefficient, and the R may be less than N. The association vectors may include the same number of elements with value 1, and the modified basis vectors may all include the same number of elements. Alternatively, the association vectors may not include the same number of elements with value 1, and the modified basis vectors may not all include the same number of elements.

Meanwhile, the association vector may be configured such that elements with value 1 are arranged continuously. In this case, in one example, the information on an association vector may be obtained from the bitstream, and the association vector may be derived based on the information on an association vector. For example, the information on an association vector may include information representing a starting point of elements with value 1, and information representing the number of elements with value 1. Alternatively, for example, the information on an association vector may include information representing a last position of elements with value 1, and information representing the number of elements with value 1.

Alternatively, in another example, the association vector may be derived based on the size of the top-left target region. For example, a starting point of elements with value 1 in the association vector and the number of the elements with value 1 may be derived based on the size of the top-left target region.

Alternatively, in another example, the association vector may be derived based on the intra prediction mode of the target block. For example, a starting point of elements with value 1 in the association vector and the number of the elements with value 1 may be derived based on the intra prediction mode. Further, for example, the starting point of elements with value 1 in the association vector and the number of the elements with value 1 may be derived based on whether the intra prediction mode is a non-directional intra prediction mode.

If the modified transform coefficients are derived, the decoding device may derive the residual samples by performing a core transform on the target block including the modified transform coefficients.

The core transform for the target block may be performed as follows. The decoding device may obtain an AMT flag from the bitstream, which represents whether the adaptive multiple core transform (AMT) is applied or not, and if the value of the AMT flag is 0, the decoding device may derive DCT type 2 as a transform kernel for the target block, and may derive the residual samples by performing an inverse transform on the target block including the modified transform coefficients based on the DCT type 2.

If the value of the AMT flag is 1, the decoding device may configure a transform subset for a horizontal transform kernel, and a transform subset for a vertical transform kernel, may derive a horizontal transform kernel and a vertical transform kernel based on the transform subsets, and a transform index information obtained from the bitstream, and may derive the residual samples by performing an inverse transform on the target block including the modified transform coefficients based on the horizontal transform kernel and the vertical transform kernel. In this regard, the transform subset for a horizontal transform kernel and the transform subset for a vertical transform kernel may include DCT type 2, DST type 7, DCT type 8, and/or DST type 1 as a candidate. Further, the transform index information may include an AMT horizontal flag indicating one of candidates included in the transform subset for a horizontal transform kernel, and an AMT vertical flag indicating one of candidates included in the transform subset for a vertical transform kernel. Meanwhile, the transform kernel may be called a transform type or a transform core.

The decoding device generates a reconstructed picture based on the residual samples (S1320). The decoding device may generate a reconstructed picture based on the residual samples. For example, the decoding device may perform inter prediction or intra prediction on a target block based on prediction information received through a bitstream, may derive prediction samples, and may generate the reconstructed picture through addition of the prediction samples with the residual samples. After this, as described above, an in-loop filtering procedure such as an ALF procedure, SAO and/or deblocking filtering may be applied as needed to the reconstructed picture in order to improve subjective/objective video quality.

Figure 14:
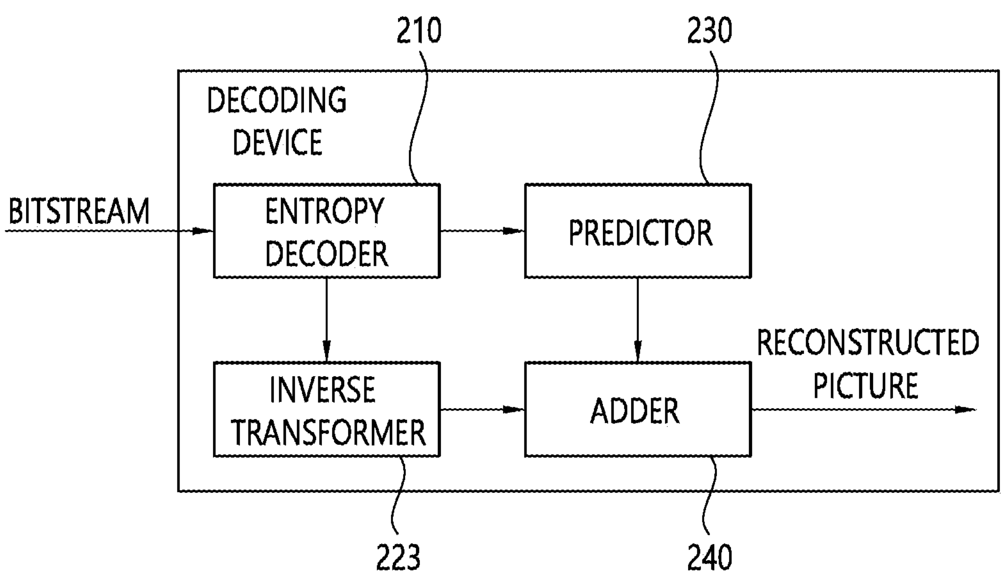
FIG. 14 schematically represents a decoding device performing an image decoding method according to the present disclosure.

FIG. 14 schematically represents a decoding device performing an image decoding method according to the present disclosure. The method disclosed in FIG. 13 may be performed by the decoding device disclosed in FIG. 14. Specifically, for example, an entropy decoder of the decoding device of FIG. 14 may perform S1300 in FIG. 13; an inverse transformer of the decoding device of FIG. 14, S1310 in FIG. 13; and an adder of the decoding device of FIG. 14, S1320 of FIG. 13. Further, although not shown, a process of deriving a prediction sample may be performed by a predictor of the decoding device of FIG. 14.

According to the above-described present disclosure, through efficient transform it is possible to reduce amount of data that must be transferred for a residual process, and increase the residual coding efficiency.

Further, according to the present disclosure, it is possible to perform non-separable transform based on a transform matrix consisting of a basis vector including a specific number of selected elements, through which it is possible to decrease a memory load and computational complexity for non-separable transform, and increase the residual coding efficiency.

Additionally, according to the present disclosure, the non-separable transform can be performed based on a transform matrix of a simplified architecture, through which it is possible to reduce amount of data that must be transferred for a residual process, and to increase the residual coding efficiency.

In the above-described embodiments, the methods are explained based on flowcharts by means of a series of steps or blocks, but the present disclosure is not limited to the order of steps, and a certain step may occur in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding device and/or decoding device according to the disclosure may be included in a device for image processing, such as, a TV, a computer, a smartphone, a set-top box, a display device or the like.

When embodiments in the present disclosure are embodied by a software, the above-described methods may be embodied as modules (processes, functions or the like) to perform the above-described functions. The modules may be stored in a memory and may be executed by a processor. The memory may be inside or outside the processor and may be connected to the processor via a well-known various means. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding device and the encoding device to which the present disclosure is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment based on a user's request through the web server, which functions as an instrument that informs a user of what service there is. When the user requests a service which he or she wants, the web server transfers it to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

What is claimed is:

1. An image decoding method performed by a decoding apparatus, the method including:

deriving transform coefficients of a target block from a bitstream;

deriving residual samples for the target block based on a non-separable transform for the transform coefficients; and generating a reconstructed picture based on the residual samples for the target block and prediction samples for the target block, wherein the non-separable transform is performed based on a transform matrix, wherein the transform matrix includes modified basis vectors, wherein each of the modified basis vectors includes fewer than N elements, wherein the N is equal to the number of transform coefficients located in a region in which the non-separable transform is applied in the target block, wherein the region in which the non-separable transform is applied is a 8×8 top-left region in the target block and N is equal to 64, and wherein a number of the modified basis vectors is less than N.

2. An image encoding method performed by an encoding apparatus, the method including:

deriving residual samples of a target block;

deriving transform coefficients of the target block based on a non-separable transform for the residual samples; and encoding information on the transform coefficients, wherein the non-separable transform is performed based on a transform matrix, wherein the transform matrix includes modified basis vectors, wherein each of the modified basis vectors includes fewer than N elements, wherein the N is equal to the number of transform coefficients located in a region in which the non-separable transform is applied in the target block, wherein the region in which the non-separable transform is applied is a 8×8 top-left region in the target block and N is equal to 64, and wherein a number of the modified basis vectors is less than N.

3. A transmission method for data comprising a bitstream for an image, the method comprising:

obtaining the bitstream for the image, wherein the bitstream is generated by performing deriving residual samples of a target block, deriving transform coefficients of the target block based on a non-separable transform for the residual samples, and encoding information on the transform coefficients to generate the bitstream; and transmitting the data comprising the bitstream, wherein the non-separable transform is performed based on a transform matrix, wherein the transform matrix includes modified basis vectors, wherein each of the modified basis vectors includes fewer than N elements, wherein the N is equal to the number of transform coefficients located in a region in which the non-separable transform is applied in the target block, wherein the region in which the non-separable transform is applied is a 8×8 top-left region in the target block and N is equal to 64, and wherein a number of the modified basis vectors is less than N.

* * * * *